US008267741B2

(12) United States Patent
Kimura et al.

(10) Patent No.: US 8,267,741 B2
(45) Date of Patent: Sep. 18, 2012

(54) GLASS SUBSTRATE MANUFACTURING METHOD, GLASS SUBSTRATE POLISHING METHOD, GLASS SUBSTRATE POLISHING APPARATUS AND GLASS SUBSTRATE

(75) Inventors: Hiroshi Kimura, Tokyo (JP); Kuninobu Ikeda, Tokyo (JP); Ryu Yamaguchi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/883,519

(22) Filed: Sep. 16, 2010

(65) Prior Publication Data
US 2011/0064971 A1 Mar. 17, 2011

(30) Foreign Application Priority Data
Sep. 17, 2009 (JP) ................. 2009-215801

(51) Int. Cl.
*B24B 49/00* (2006.01)
(52) U.S. Cl. ............... 451/5; 451/41; 451/57; 451/268; 451/66
(58) Field of Classification Search ............... 451/5, 41, 451/57, 268, 66
See application file for complete search history.

(56) References Cited

U.S. PATENT DOCUMENTS

| 4,525,958 | A | * | 7/1985 | Reissig | 451/26 |
|---|---|---|---|---|---|
| 4,916,868 | A | * | 4/1990 | Wittstock | 451/28 |
| 5,827,112 | A | * | 10/1998 | Ball | 451/21 |
| 6,093,080 | A | * | 7/2000 | Inaba et al. | 451/5 |
| 6,210,259 | B1 | * | 4/2001 | Malkin et al. | 451/166 |
| 6,315,638 | B1 | * | 11/2001 | Marukawa | 451/36 |
| 6,371,834 | B1 | * | 4/2002 | Fujimura et al. | 451/41 |
| 6,491,572 | B1 | * | 12/2002 | Horie et al. | 451/63 |
| 6,530,825 | B2 | * | 3/2003 | Fujimura et al. | 451/41 |
| 6,572,440 | B2 | * | 6/2003 | Moore | 451/5 |
| 6,572,443 | B1 | * | 6/2003 | Beckage et al. | 451/6 |
| 6,572,444 | B1 | * | 6/2003 | Ball et al. | 451/10 |
| 6,648,735 | B2 | * | 11/2003 | Miyashita et al. | 451/41 |
| 6,984,164 | B2 | * | 1/2006 | Kimura et al. | 451/8 |
| 7,052,373 | B1 | * | 5/2006 | Yang et al. | 451/41 |
| 7,070,481 | B1 | * | 7/2006 | Miyamoto | 451/44 |
| 7,097,535 | B2 | * | 8/2006 | Glashauser et al. | 451/5 |
| 7,147,541 | B2 | * | 12/2006 | Nagayama et al. | 451/5 |
| 7,540,800 | B2 | * | 6/2009 | Kozasa et al. | 451/8 |
| 7,775,853 | B2 | * | 8/2010 | Jeong et al. | 451/8 |
| 7,959,493 | B2 | * | 6/2011 | Horie et al. | 451/36 |

(Continued)

FOREIGN PATENT DOCUMENTS
JP 2002-046065 2/2002
(Continued)

OTHER PUBLICATIONS
Search Report released Mar. 26, 2012, in Philippine Patent Application No. 1-2010-000285, filed Sep. 16, 2010.

*Primary Examiner* — George Nguyen
(74) *Attorney, Agent, or Firm* — Oblon, Spivak, McClelland, Maier & Neustadt, L.L.P.

(57) ABSTRACT

A polishing apparatus, includes: a motor; and a controlling unit configured to control the motor, wherein: a glass substrate is polished by causing the controlling unit to control a driving of the motor; and the controlling unit executes a controlling operation for controlling a polishing of the glass substrate, based on an electric power or an electric energy required for the driving of the motor.

18 Claims, 18 Drawing Sheets

U.S. PATENT DOCUMENTS

| | | | |
|---|---|---|---|
| 2001/0014573 A1* | 8/2001 | Shimoi et al. | 451/41 |
| 2002/0001738 A1* | 1/2002 | Uhlik et al. | 428/694 ST |
| 2002/0173222 A1* | 11/2002 | Benning et al. | 451/5 |
| 2003/0082999 A1* | 5/2003 | Yoshikawa et al. | 451/41 |
| 2009/0042487 A1* | 2/2009 | Tokura et al. | 451/41 |
| 2009/0233529 A1 | 9/2009 | Ueda | |

FOREIGN PATENT DOCUMENTS

| | | |
|---|---|---|
| JP | 2004-345018 | 12/2004 |
| JP | 2006-133751 | 5/2006 |
| JP | 2008-825 | 1/2008 |
| JP | 2010-234467 | 10/2010 |

* cited by examiner

FIG. 10B

| | EXAMPLE | COMPARATIVE EXAMPLE |
|---|---|---|
| THICKNESS MAXIMUM VALUE [$\mu m$] | 638.2 | 639.5 |
| THICKNESS MINIMUM VALUE [$\mu m$] | 633.0 | 624.5 |
| THICKNESS AVERAGE VALUE [$\mu m$] | 635.4 | 634.8 |
| THICKNESS STANDARD DEVIATION [$\mu m$] | 1.03 | 3.13 |
| THICKNESS VARIATION DIMENSION RANGE [$\mu m$] | 5.2 | 15.0 |

GLASS SUBSTRATE MANUFACTURING METHOD, GLASS SUBSTRATE POLISHING METHOD, GLASS SUBSTRATE POLISHING APPARATUS AND GLASS SUBSTRATE

BACKGROUND

1. Field of the Invention

The present invention relates to the technology to control polishing processes of a glass substrate with high accuracy.

2. Description of the Related Art

In the prior art, such approaches are studied that, upon performing the polishing process of the glass substrate, the polishing process should be performed with high accuracy by grasping precisely respective states of a polishing apparatus and a polished subject during the polishing process and then controlling the polishing process of the glass substrate based on detected information.

Out of them, the method of polishing the glass substrate while controlling an amount of polishing with high accuracy has an influence largely upon the plate thickness as the important quality characteristic that is required of the glass substrate products. For this reason, various methods are discussed now.

For example, in the glass substrate for the magnetic recording medium, with the progress of higher recording density in recent years, the demand for process accuracy of the glass substrate used in the magnetic recording medium is escalating. According to this demand, the glass substrate whose dimensional variation of plate thickness is small is demanded.

As the conventional methods of controlling an amount of polishing of the glass substrate, there are known (1) the method of controlling an amount of polishing, by calculating a polishing rate of the main polishing every lot by using the polishing rate obtained when the polishing process was conducted in advance, then deciding an amount of necessary polishing by measuring a plate thickness of the glass substrate prior to the polishing by means of the weighing method or the micrometer method, then calculating a polishing time based on the polishing rate of the main polishing and the necessary polishing, and then deciding the polishing time every lot, (2) the method of controlling an amount of polishing of the magnetic disc substrate by measuring a vertical movement of the supporting pins of the upper platen, which supports the upper platen of the polishing apparatus, by using an eddy-current sensor, or the method of controlling a plate thickness of the magnetic disc substrate by specifying a relative vertical position of the supporting pins of the upper platen with respect to the slider by using the contact type displacement sensor (see JP-A-2004-345018, for example), and (3) the method of managing an amount of polishing, by sampling the glass substrate for the amount-of-polishing measurement during the polishing process, and then measuring an amount of reduction of mass from the glass substrate before the polishing (see JP-A-2008-825, for example).

However, in the conventional method (1), the polishing rate of the main polishing is calculated by using an empirical formula of the polishing rate. Therefore, in the situation that the polishing rate of the main polishing is out of the empirical prediction, such problems arise that the glass substrate whose thickness is excessively reduced due to the excessive polishing should be discarded, the glass substrate that could not be polished within a desired dimensional range as a target dimension due to the insufficient polishing should be polished once again, and the like. As a result, a variation in dimension of a thickness of the glass substrate is increased.

Also, in the conventional method (2), such problems arise that a labor and a cost are needed to fit a thickness measuring mechanism to the polishing apparatus, and a thickness cannot be controlled sufficiently with high accuracy due to a vibration of the apparatus, an influence of a temperature rise of the apparatus members caused by the machining, and contamination of a sensing portion of the sensor.

Also, in the conventional method (3), the polishing apparatus is stopped once in the course of the polishing process, then the glass substrate for the amount-of-polishing measurement is sampled and cleaned/dried, and then a mass must be measured. As a result, a variation in thickness dimension of the glass substrate is increased, and productivity is lowered.

SUMMARY

Therefore, it is an object of the present invention to provide a glass substrate manufacturing method, and a polishing method and a polishing apparatus, which are capable of improving an accuracy in the polishing process of a glass substrate, and a glass substrate which is capable of improving quality characteristics of application products and quality stability.

According to an aspect of the invention, there is provided a glass substrate manufacturing method including the polishing step of polishing a glass substrate by a driving of a motor provided in a polishing apparatus, including: executing a controlling operation to control a polishing of the glass substrate in the polishing step, based on an electric power or an electric energy required for a driving of the motor.

According to another aspect of the invention, there is provided a glass substrate polishing method of polishing a glass substrate by a driving of a motor provided in a polishing apparatus, including: adjusting an amount of polishing of the glass substrate, based on an electric power or an electric energy required for a driving of the motor.

According to still another aspect of the invention, there is provided a polishing apparatus, including: a motor; and a controlling unit configured to control the motor; a glass substrate is polished by causing the controlling unit to control a driving of the motor, and the controlling unit executes a controlling operation for controlling a polishing of the glass substrate, based on an electric power or an electric energy required for the driving of the motor.

According to the glass substrate manufacturing method and the polishing method and the polishing apparatus of the present invention, an accuracy in the polishing process of a glass substrate cab be improved. Also, according to the glass substrate of the present invention, the quality characteristics of application products and the quality stability can be improved.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 10B is a view showing measured results of a thickness of the glass substrate after the primary polishing is ended.

DETAILED DESCRIPTION OF THE INVENTION

A mode for carrying out the present invention will be explained hereinafter. But the present invention is not limited to the embodiments set forth in the following.

Figure 1A:
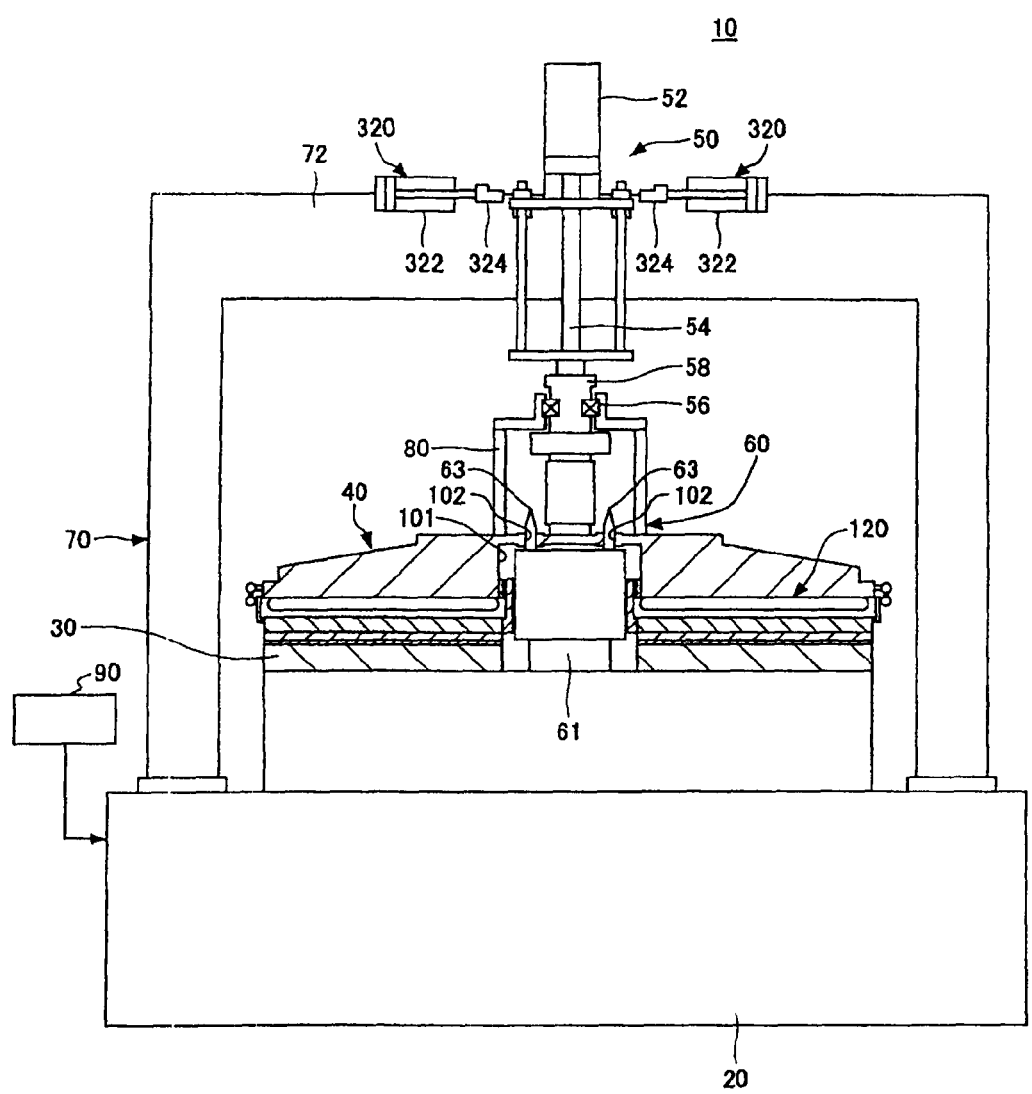
FIG. 1A is a longitudinal sectional view of a double-side polishing apparatus 10 as an embodiment of the present invention.

FIG. 1A is a longitudinal sectional view of a double-side polishing apparatus 10 as an embodiment of the present invention. As shown in FIG. 1A, the double-side polishing apparatus 10 is constructed to polish simultaneously upper surfaces and lower surfaces of a plurality of glass substrates, and includes a base 20, a lower platen 30, an upper platen 40, an elevating mechanism 50, and a rotation transferring mechanism 60. The lower platen 30 is supported rotatably over the upper portion of the base 20. A driving motor for turning/driving the upper platen 40, etc. is fitted in the base 20 as a driving portion described later.

The lower platen 30 has a lower-side abrasive pad for polishing lower surfaces of a plurality of glass substrates that are held in the carrier, as described later. Also, the upper platen 40 has an upper-side abrasive pad that is arranged oppositely over the lower platen 30 to polish upper surfaces of a plurality of glass substrates.

The elevating mechanism 50 is supported by a gate-type frame 70 that provided upright over the base 20, and has an elevating cylinder unit 52 for elevating the upper platen 40 when the carrier is exchanged. The elevating cylinder unit 52 is fitted a center of a beam 72 of the frame 70 to expand and contract in the vertical direction. A piston rod 54 of the elevating cylinder unit 52 is provided to extend downward, and a shaft member 58 fitted in the inner peripheral side of a bearing 56 is coupled to the top end of the piston rod 54. The bearing 56 supports rotatably the upper platen 40. Also, a rotary joint is provided to a bottom portion of the shaft member 58.

Also, a suspending member 80 fitted onto the outer peripheral side of the bearing 56 is fitted to suspend the upper platen 40. Accordingly, when the piston rod 54 of the elevating cylinder unit 52 is driven in the upper direction or the lower direction, the upper platen 40 coupled to the piston rod 54 via the suspending member 80 is simultaneously driven to rise or fall.

Also, a dress-positioning stopper mechanism 320 is provided to the beam 72 of the frame 70 on both sides of the elevating cylinder unit 52. This dress-positioning stopper mechanism 320 positions the upper platen 40 in the position where the upper platen 40 is lifted up by a thickness of the dress carrier (e.g., about 20 mm) when the dressing process, described later, is applied to put the surface of the abrasive pad in order. The dress-positioning stopper mechanism 320 is equipped with a horizontally driving cylinder unit 322 fitted in the horizontal direction, and a stopper plate 324 supported at the top end of the piston rod of the horizontally driving cylinder unit 322. Normally, the stopper plate 324 stands by on the outside of the elevating cylinder unit 52. When the dressing process is applied, the stopper plate 324 is driven toward the center, and positions the piston rod 54 in the position where the piston rod 54 is moved upward by a thickness of the dress carrier.

Of course, either the dress-positioning stopper mechanism 320 may be omitted or the upper platen 40 may be positioned in the dressing process by the other structure.

Figure 1B:
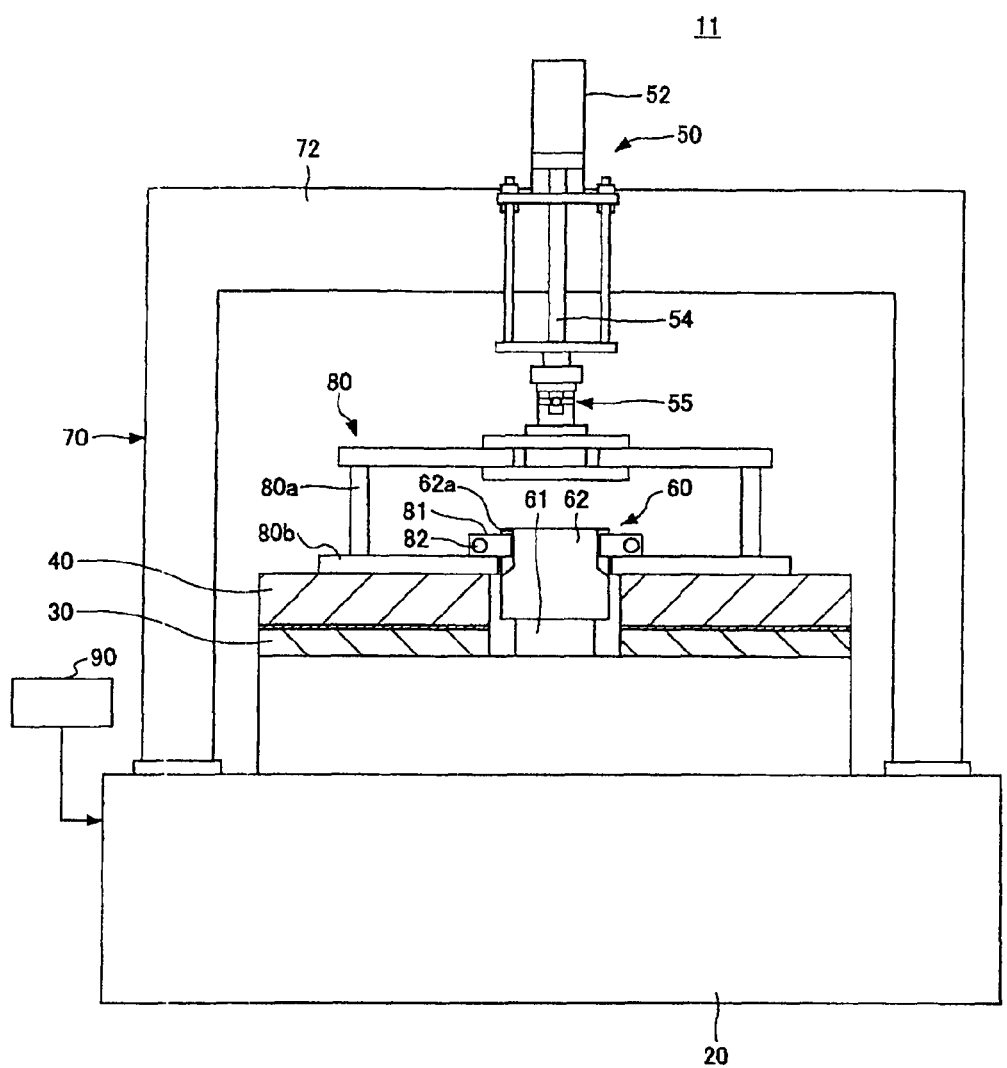
FIG. 1B is a longitudinal sectional view of a double-side polishing apparatus 11 as another embodiment of the present invention.

FIG. 1B is a longitudinal sectional view of a double-side polishing apparatus 11 as another embodiment of the present invention. In FIG. 1B, the same reference symbols are affixed to the functionally same configurations as those of the double-side polishing apparatus 10 shown in FIG. 1A, and their explanations will be omitted hereunder.

A universal joint 55 connected to a center portion of the suspending member 80 is coupled to the lower top end portion of the piston rod 54. The suspending member 80 has a plurality of struts 80a that extends in the vertical direction, and an annular fitting member 80b fixed to lower end portions of the struts 80a. The upper surface of the upper platen 40 is fixed to a bottom surface of the annular fitting member 80b. Therefore, when the piston rod 54 of the elevating cylinder unit 52 is driven in the upper direction or the lower direction, the upper platen 40 coupled to the piston rod 54 via the universal joint 55 and the suspending member 80 is also driven simultaneously to rise or fall.

The double-side polishing apparatuses 10, 11 have the upper platen 40, the elevating mechanism 50, and the rotation transferring mechanism 60 respectively.

Figure 2A:
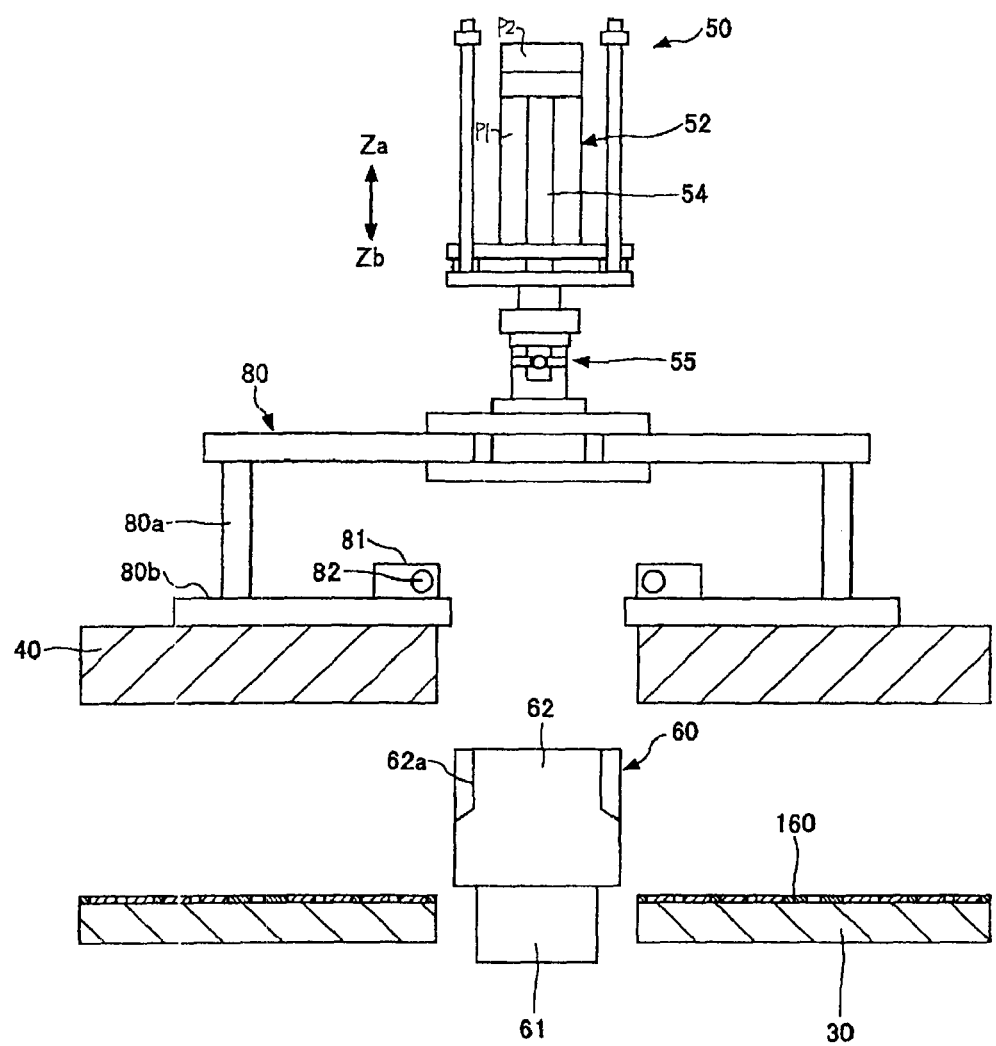
FIG. 2A is a longitudinal sectional view showing schematically a state that an upper platen is lifted up.

FIG. 2A is a longitudinal sectional view showing schematically a state that the upper platen is lifted up. In FIG. 2A, the state that the upper platen of the double-side polishing apparatus 11 is lifted up is illustrated as a typical example.

The upper platen 40 is lifted by the elevating cylinder unit 52 in the carrier exchange or the pad exchange, and is moved upward (in the Za direction) over the lower platen 30. In this lifted state, a plurality of glass substrates, which are put on the upper surface of the lower platen 30 and whose polishing step is ended, and a carrier 160 (described later, see FIG. 3) can be picked up, and then another or the same cleaned carrier 160 and the unpolished glass substrate can be put on the upper surface of the lower platen 30.

Also, in the case of the double-side polishing apparatus 10 shown in FIG. 1A, the rotation transferring mechanism 60 has a coupling portion 62 that is formed like a cylindrical shape on a top end of a motor driving shaft 61 of the driving motor for the upper platen 40. This coupling portion 62 has a plurality of coupling pins 63, which are fitted into coupling holes 102 provided to a driven hole 101 of the upper platen 40, on an upper surface. These coupling pins 63 are formed like a circular cone whose top end is readily inserted into the coupling hole 102, respectively. Also, the upper platen 40 is put down by the elevating cylinder unit 52, relative positions of the coupling holes 102 and the coupling pins 63 can be made to coincide with each other, by falling the upper platen 40 in a state that registration marks provided in advance to the upper platen 40 and the coupling portion 62 are caused to coincide with each other.

In contrast, in the case shown in FIG. 1B, the rotation transferring mechanism 60 has a key (claw) 81 that can be fitted into a key slot (concave portion) 62a. This key slot 62a is formed on an upper side surface of the coupling portion 62 that passes through a center hole of the upper platen 40. The key 81 protruded to the inner peripheral side of the upper platen 40 is fitted swingably to the annular fitting member 80b by the supporting pins 82 to swing on supporting pins 82.

The key 81 is fitted into the key slot 62a in a state that the upper platen 40 is put down, while the key 81 is disconnected from the key slot 62a in a state that the upper platen 40 is lifted up. A driving torque of the driving motor of the upper platen 40 is transferred to the upper platen 40 in a condition that the key 81 and the key slot 62a are coupled mutually. Thus, the upper platen 40 is rotated together with the coupling portion 62.

Figure 2B:
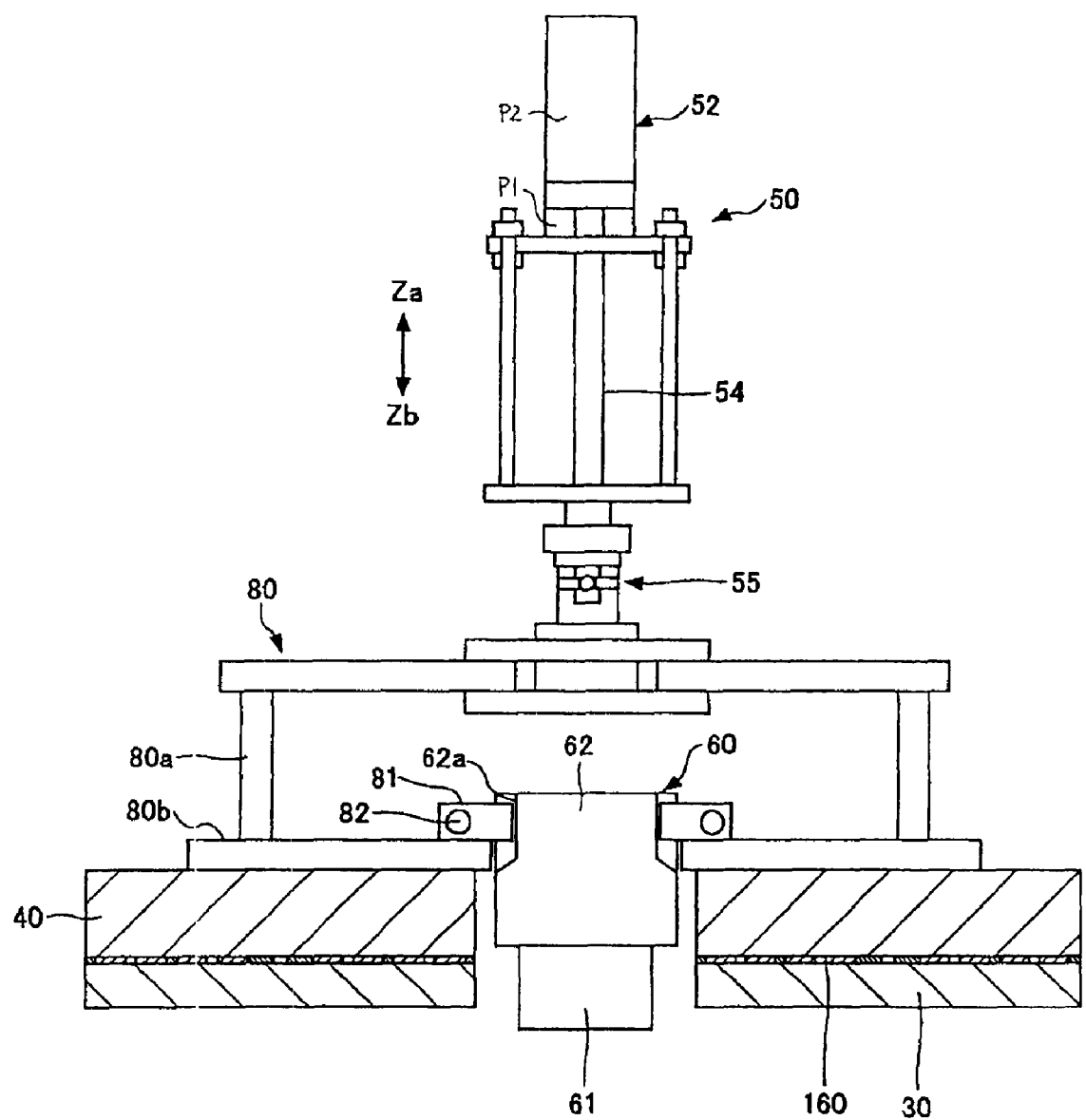
FIG. 2B is a longitudinal sectional view showing schematically a state that an upper platen is put down.

FIG. 2B is a longitudinal sectional view showing schematically a state that the upper platen is put down. As shown in FIG. 2B, when a supplied pressure P1 of a compressed air is set lower than a lower chamber of the elevating cylinder unit 52 (at this time, an upper chamber of the elevating cylinder unit 52 is opened into the atmosphere, and P2 is an atmospheric pressure) and thus the piston rod 54 of the elevating cylinder unit 52 is driven downward (in the Zb direction) by its own weight of the upper platen 40, the upper platen 40 falls together with the suspending member 80.

In the case of the double-side polishing apparatus 10 shown in FIG. 1A, a rotating torque of the drive motor of the upper platen 40 is transferred to the upper platen 40 via the coupling pins 63 and the coupling holes 102 provided upright on the coupling portion 62. Also, the rotation transferring mechanism 60 is constructed by fitting the coupling pins 63 and the coupling holes 102 together mutually. Therefore, in comparison with the double-side polishing apparatus 11 having the key structure shown in FIG. 1B, the double-side polishing apparatus 10 is constructed not to generate a component of force in the vertical direction because a motion in the vertical direction (like a rubbing motion in the vertical direction) generated by the fitting between the key slot 62a and the key 81, which are formed to extend in the axial direction of the coupling portion 62, is prevented.

Here, upon carrying out the present invention, the polishing apparatus with the coupling pin structure shown in FIG. 1A may be employed or the polishing apparatus with the coupling pin structure shown in FIG. 1B may be employed.

Also, the driving motor for rotating/driving the upper platen 40, etc. is not provided in the frame 70 but is arranged in the base 20. Therefore, a vibration caused in the polishing motion can be suppressed by lowering a center of gravity of the whole apparatus, and also stability in the polishing motion can be enhanced much more.

Here, in FIG. 2B, the upper platen 40 is brought into contact with the upper surfaces of a plurality of glass substrates loaded on the lower platen 30 by its own weight or under a predetermined pressure.

Figure 3:
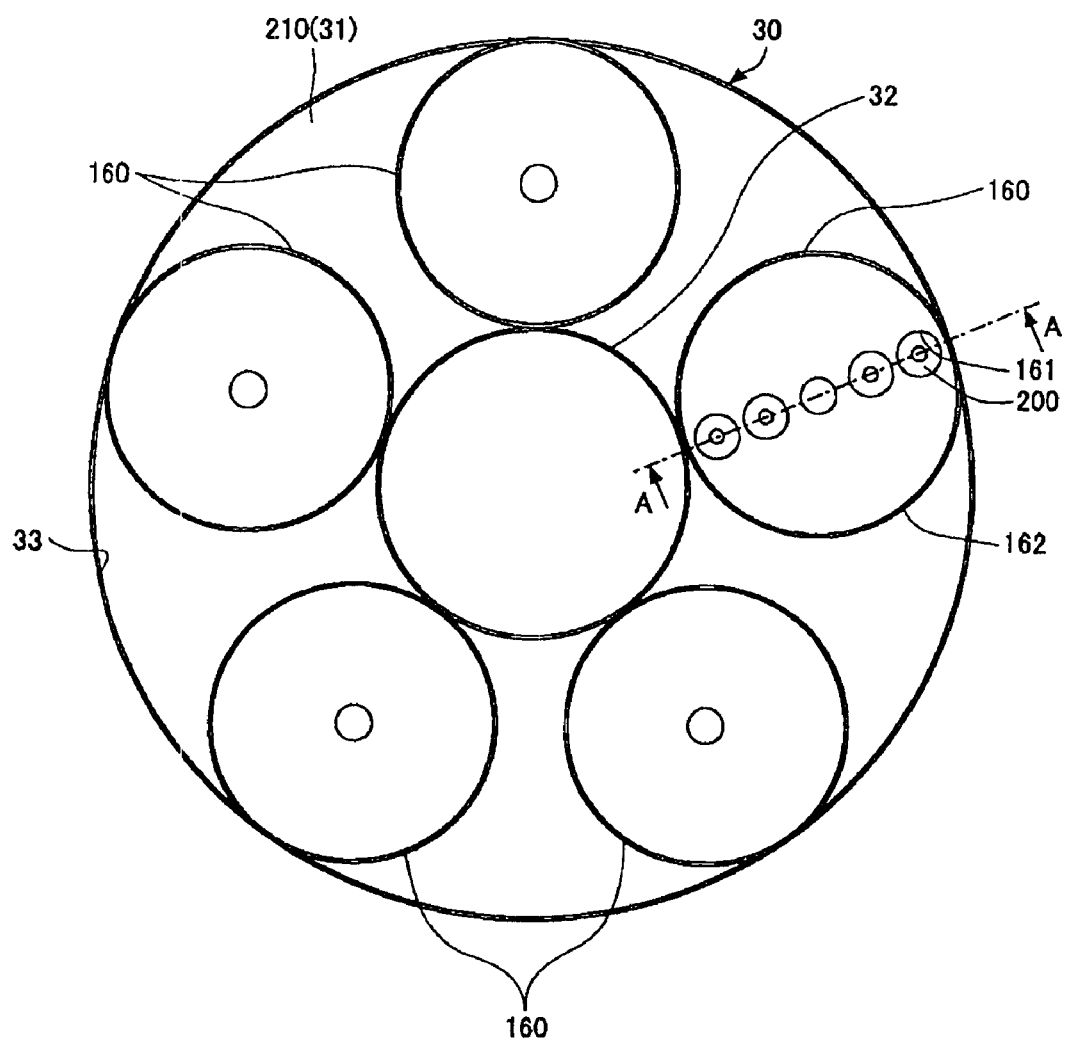
FIG. 3 is a plane view showing a fitted state of a carrier that is put on a lower platen.

FIG. 3 is a plane view showing the carrier that is put on the lower platen 30. As shown in FIG. 3, a plurality of carriers 160 are put on an upper surface 31 of the lower platen 30. The carrier 160 is formed like a circular disc by a resin material that is thinner than a glass substrate 200, and a large number of housing holes 161 in which the glass substrate 200 is housed are provided concentrically. A large number of housing holes 161 are formed to have a dimension that allows an outer periphery of each housed glass substrate 200 to be held without ricketiness respectively. In the present embodiment, such a configuration is shown by way of example that five carriers 160 are arranged. But the configuration is not limited to this example, and fiver carriers or more or fiver carriers or less may be arranged in response to sizes (diameters) of the lower platen 30 and the carriers 160.

Also, a sun gear 32 is inserted into a turning center hole of the upper surface 31 of the lower platen 30 from the bottom. An internal gear 33 is provided on the outside of the outer periphery of the upper surface 31 of the lower platen 30 in a position where this internal gear 33 engages with gears 162 of the carriers 160. The gears 162 formed on the outer periphery of the carriers 160 engage with the sun gear 32 and the internal gear 33. Therefore, according to the rotation of the lower platen 30 by the driving motor provided to the base 20, the internal gear 33 is rotated relatively in the circumferential direction of the sun gear 32 (i.e., the internal gear 33 is rotated in the opposite direction along the circumferential direction of the sun gear 32), and also the carriers 160 revolves round the sun gear 32 in the circumferential direction while turning on its axis. Also, the sun gear 32 and the internal gear 33 are turned by the driving motors provided to drive these gears respectively. Accordingly, deviation in an amount of polishing of each glass substrate 200 housed in each housing hole 161 of each carrier 160 can be prevented, and a plate thickness of the glass substrate after the polishing can be made uniform.

Figure 4:
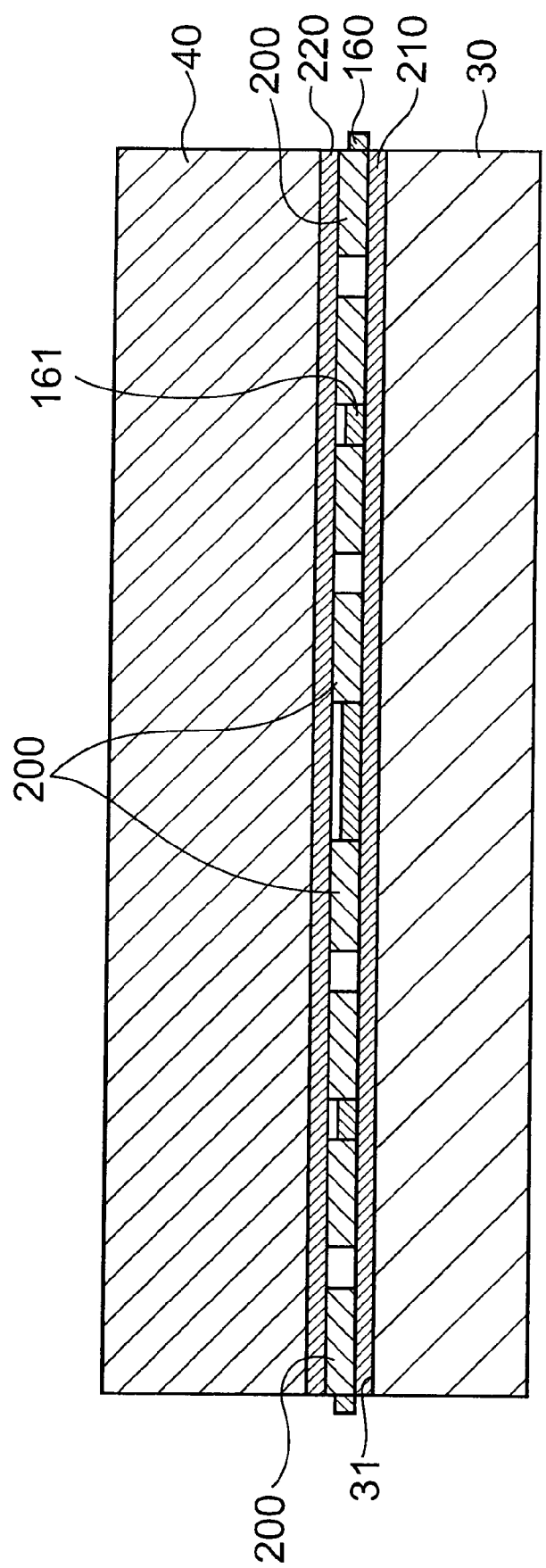
FIG. 4 is a longitudinal sectional view showing schematically a section taken along an A-A line in FIG. 3 in an enlarged manner.

FIG. 4 is a longitudinal sectional view showing schematically a section taken along an A-A line in FIG. 3 in an enlarged manner. As shown in FIG. 4, in the polishing action, a lower abrasive pad 210 held on the upper surface 31 of the lower platen 30 comes into contact with respective lower surfaces of the glass substrates 200, and also an upper abrasive pad 220 held under the upper platen 40, which is put down to the polishing position by the elevating mechanism 50, comes into contact with respective upper surfaces of the glass substrates 200. Therefore, in the double-side polishing apparatuses 10, 11, the upper platen 40 and the lower platen 30 are rotated relatively (i.e., the upper platen 40 is rotated along the circumferential direction in the opposite direction to the lower platen 30). Thus, the upper surfaces and the lower surfaces of the glass substrates 200 being held in the carrier 160 between the upper platen 40 and the lower platen 30 can be polished simultaneously. Here, respective surfaces of the lower abrasive pad 210 and the upper abrasive pad 220 that contact to respective glass substrates 200 act as the abrasive surfaces.

Then, a configuration of the driving portion provided to the base 20 will be explained hereunder.

Figure 5:
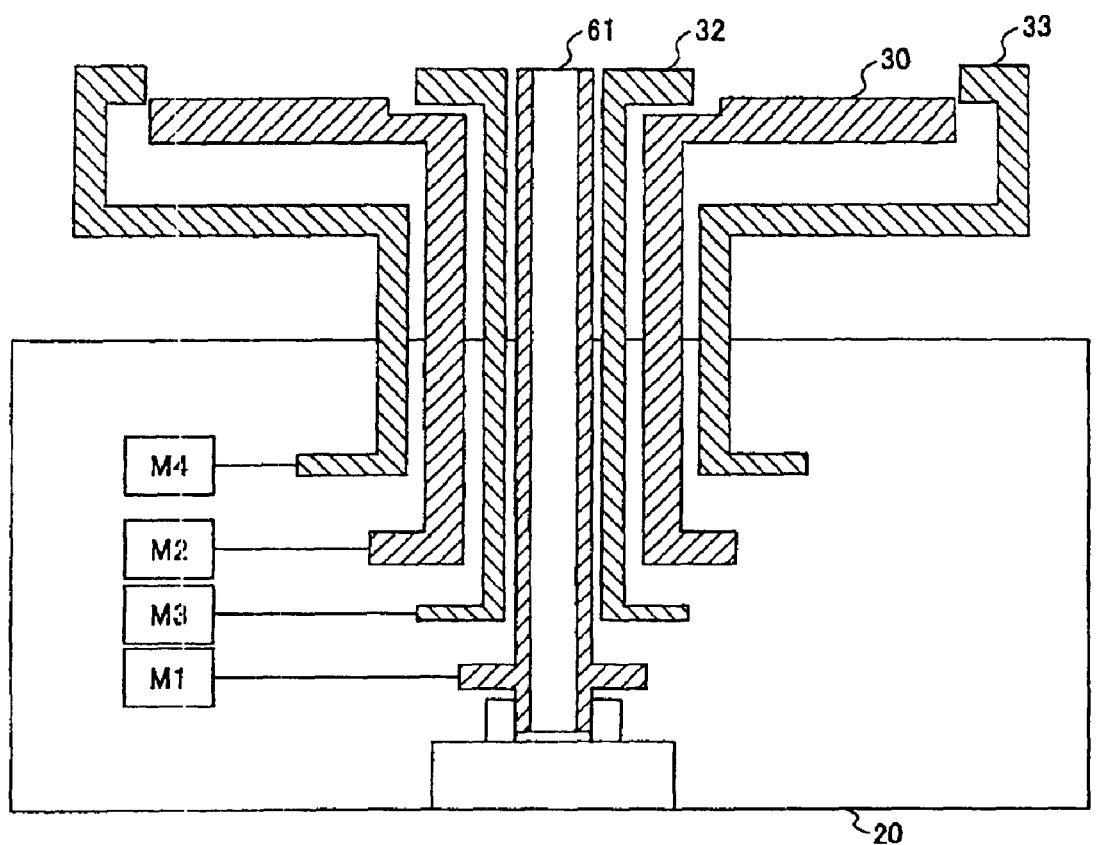
FIG. 5 is a configurative view of a driving portion housed in a base 20, a part of which is shown in section.

FIG. 5 is a configurative view of the driving portion housed in the base 20, a part of which is shown in section. The upper platen 40, the lower platen 30, the sun gear 32, and the internal gear 33 are supported on the table provided to the inner lower surface of the base 20 to turn around the same axis. A rotating power is transferred to the motor driving shaft 61 as the rotation shaft of the upper platen 40, the lower platen 30, the sun gear 32, and the internal gear 33 from a first motor. M1, a second motor M2, a third motor M3, and a motor M4 via the driving gear respectively. In FIG. 5, the case where four motors are provided as the driving motor is illustrated. However, one motor or two motors or more may be provided as the driving motor. The rotating power may be branched from one motor or two motors or more to respective gears via the gear unit to rotate the motor driving shaft 61, the lower platen 30, the sun gear 32, and the internal gear 33 respectively.

The upper platen 40 is rotated at the rotation speed in response to the driving power of the motor M1, and the lower platen 30 is rotated at the rotation speed in response to the driving power of the motor M2. The lower platen 30 is rotated in the opposite direction to the upper platen 40. Also, the sun gear 32 is rotated at the rotation speed in response to the driving power of the motor M3, and the internal gear 33 is rotated at the rotation speed in response to the driving power of the motor M4.

Figure 6:
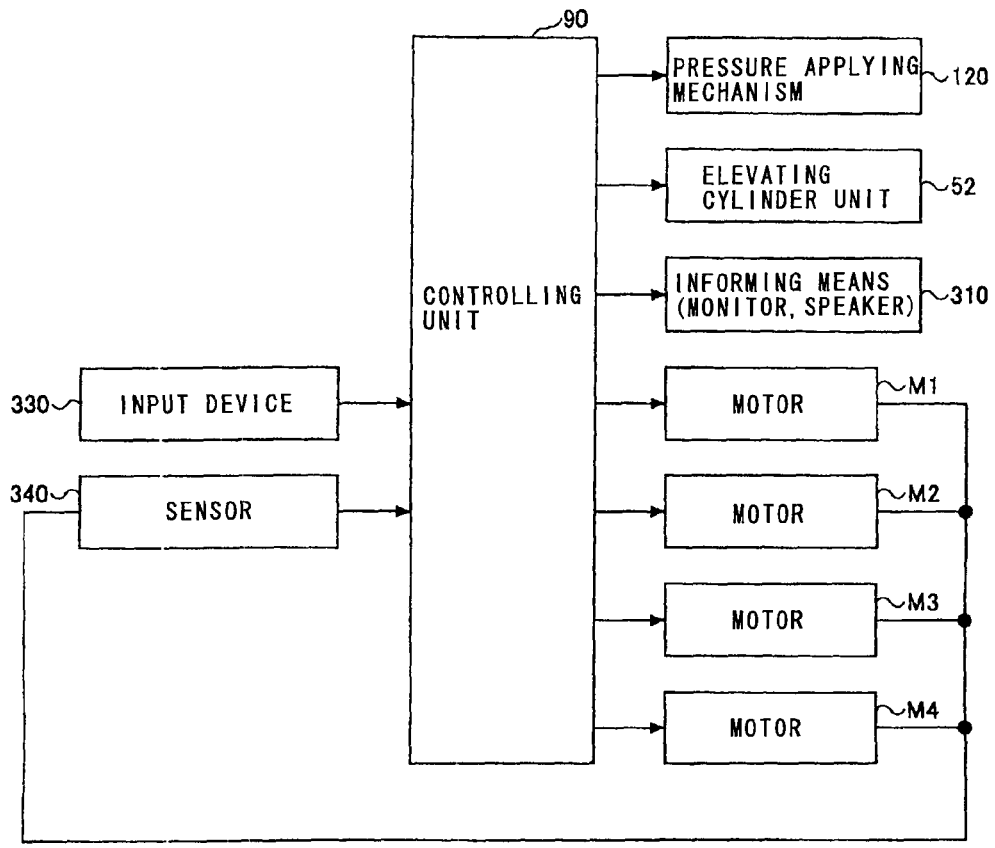
FIG. 6 is a block diagram of a control system showing respective devices that are controlled by a controlling unit.

FIG. 6 is a block diagram of a control system showing respective devices that are controlled by a controlling unit 90. As shown in FIG. 6, the controlling unit 90 is connected electrically to the elevating cylinder unit 52, a pressure applying mechanism 120, the motors M1 to M4 provided in the inside of the base 20, an informing means 310 such as a monitor, a speaker, or the like, an input device 330 for accepting input information from the worker or other controlling unit, a sensor 340 used to calculate the electric powers (or electric energies) of the motors M1 to M4, and the like. The controlling unit 90 produces control signals to control respective equipments. The controlling unit 90 has a processing unit such as CPU, or the like, and produces the control signals in compliance with a predetermined program that is processed by the processing unit.

The input device 330 is an interface unit that transfers the information accepted from the outside of the controlling unit 90 to the controlling unit 90. The input device 330 is the operation portion (e.g., a touch panel, buttons, a lever, a keyboard, or the like) via which the worker inputs the input information or the communication interface unit that makes the connection to the outside computer such as the personal computer, or the like possible.

As the sensor 340, for example, a rotation speed sensor for sensing the number of revolution of the motors M1 to M4, a current sensor for sensing the electric currents that flow through the motors M1 to M4, and the like may be listed. The controlling unit 90 calculates the electric powers (or electric energies) of the motors M1 to M4 in accordance with output signals that respond to the sensed value of the sensor 340. Also, a sensor for sensing the electric powers or the electric energies of the motors M1 to M4 may be used as the sensor 340.

Also, the controlling unit 90 controls a pressure increasing/decreasing operation of the pressure applying mechanism 120, which is used to increase/decrease a pressure that is applied to the upper surfaces of a plurality of glass substrates loaded on the lower platen 30 by the upper platen 40, and the revolutions of the motors M1 to M4, which are used to rotate/drive the upper platen 40, etc., in accordance with the output signal from the sensor 340. Thus, the controlling unit 90 controls an amount of polishing of the glass substrates.

As the method of adjusting an amount of polishing of the glass substrates (controlling method), various methods are considered up to now, as described above. For example, there is the conventional method that a time elapsed from a point of time when the polishing is started by rotating the motors M1 to M4 should be counted, and then the motors M1 to M4 are stopped to end the polishing of the glass substrates at a point of time when a predetermined time being set previously expires. However, a "predetermined time" in the case of this conventional method was set empirically based on an amount of polishing attained until a thickness dimension of the glass substrate reaches a normal value. For example, the predetermined time was set while taking totally various conditions such as hardness of the glass substrate, particle size of the abrasive on the pad, type of the slurry, pressure applied to the pad, rotation speed of the platen, polishing rate of the preceding lot, etc. into account. As a result, in some cases an error of an amount of polishing after the polishing is completed actually from an amount of polishing that is predicted in advance becomes considerable because the predetermined time in this case is a time that is set empirically.

In contrast, the inventor of the present invention focused on such a point that the polishing apparatus has a function capable of monitoring electric powers of the motors M1 to M4, and thus founds that, among all requirements that exert an influence upon an amount of polishing of the glass substrate, an electric energy of the motors that transfer a driving power to polish the glass substrate and an amount of polishing of the glass substrate have a predetermined correlation. That is, the inventor of the present invention organized the actual data that were collected under different polishing conditions such as different date, different lot, etc. Then, the inventor of the present invention verified a correlation between the actual data of an accumulated value of electric power (i.e., electric energy) when the motors used to polish the glass substrate are rotated for a predetermined time to polish and the actual data of an amount of polishing of the glass substrate, and thus founds that the accumulated value and an amount of polishing of the glass substrate have a predetermined correlation.

The predetermined correlation will be explained hereunder.

It may be considered that "a total electric energy of the motors is equal to a sum of an electric energy consumed when no polishing load is applied to the motors and an electric energy of the motors required for the polishing". Therefore, Equation (1) is satisfied where U: accumulated value of the load power (total electric energy)

Po: power per unit time without polishing load (1 second)

UV: load electric energy required to polish one sheet of disc by 1 μm

V: amount of polishing

R ($=V/t$): amount of polishing per unit time (polishing rate), which is obtained by an amount of polishing V by a rotating time t as the driving time of the motor, and N: the number of sheets of the glass substrates in one batch (lot) (the number of sheets of the glass substrates that are arranged on all carriers 160 of the polishing apparatus and are polished).

Then, Equation (2) is derived (R=V/t) by dividing both sides of Equation (1) by t to reduce the terms that contain the variable. Equation (2) can be deformed into Equation (3).

$$U = P_0 t + N U_V V \quad (1)$$

$$\frac{U}{t} = P_0 + U_V NR \quad (2)$$

$$NR = \frac{1}{U_V}\left(\frac{U}{t}\right) - \frac{P_0}{U_V} \quad (3)$$

As apparent from Equation (3), when "U/t" is considered as one variable and also "NR" is considered as one variable, "NR" can be represented by the linear function of "U/t". The "U/t" corresponds to a first variable that changes in response to an electric energy U of the motor, and the "NR" corresponds to a second variable that changes in response to an amount of polishing V of the glass substrate. The first variable "U/t" means a value obtained by dividing an electric energy U by a rotating time t of the motor, i.e., an average electric power value of the motor at a rotating time t. The second variable "NR" means a multiplied value of the number of sheets N of the glass substrates and the polishing rate R.

FIG. 7A to FIG. 7D are views in which correlations between the actual data of the first variable "U/t" and the actual data of the second variable "NR" are plotted in the double-side polishing apparatus. An abscissa denotes the first variable "U/t", and an ordinate denotes the second variable "NR".

Figure 7A:
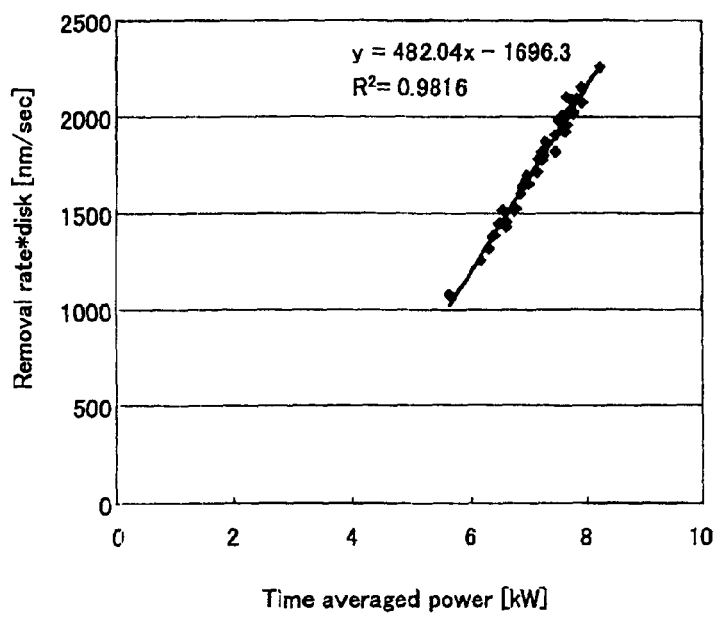
FIG. 7A is a graph showing a relationship between an average power in four driving motors and a value obtained by multiplying a polishing rate per one glass substrate by the number of glass substrates that are processed in one lot.
Figure 7B:
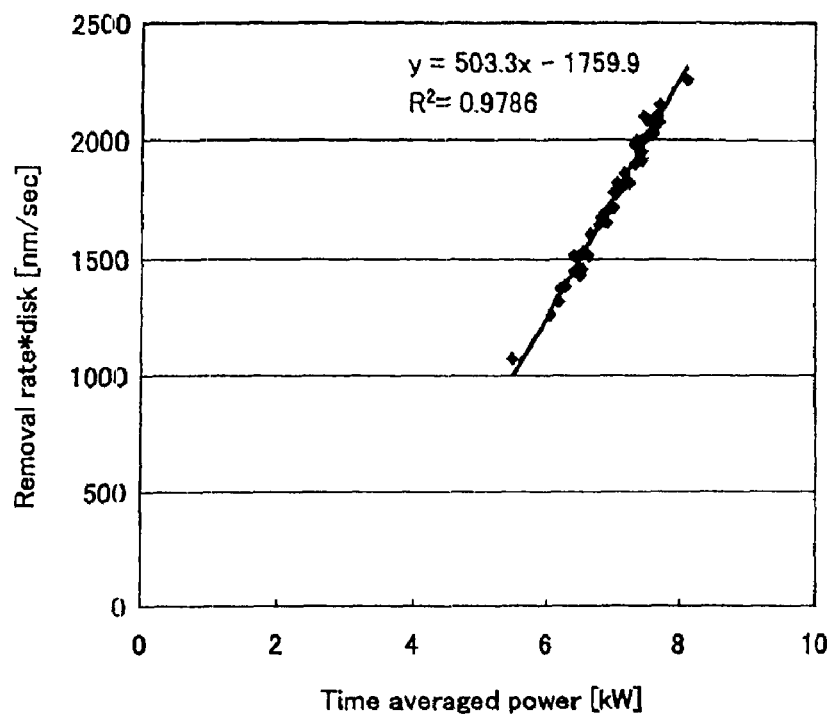
FIG. 7B is a graph showing a relationship between an average power in two driving motors and a value obtained by multiplying a polishing rate per one glass substrate by the number of glass substrates that are processed in one lot.
Figure 7C:
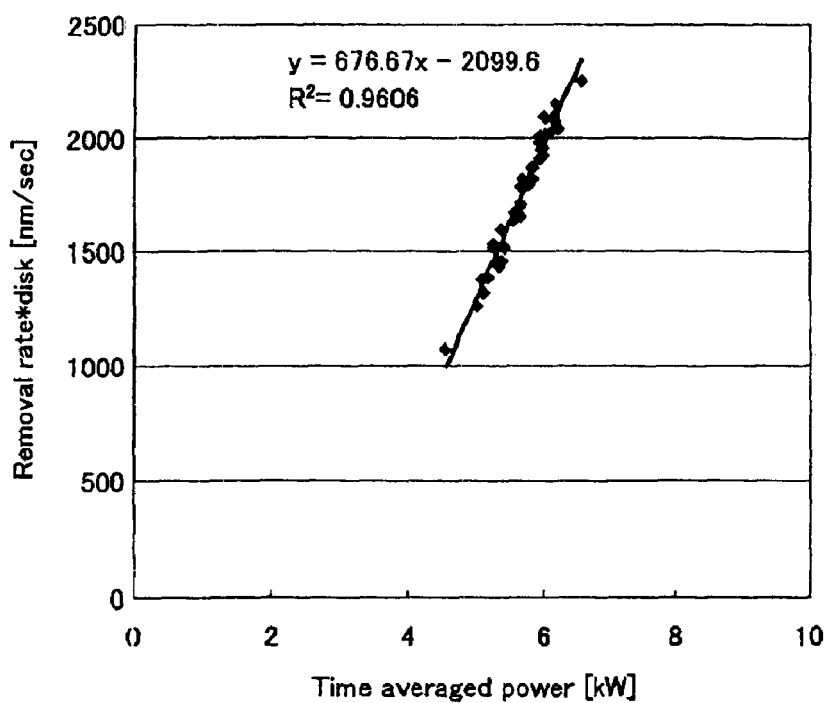
FIG. 7C is a graph showing a relationship between an average power in one driving motor (lower platen) and a value obtained by multiplying a polishing rate per one glass substrate by the number of glass substrates that are processed in one lot.
Figure 7D:
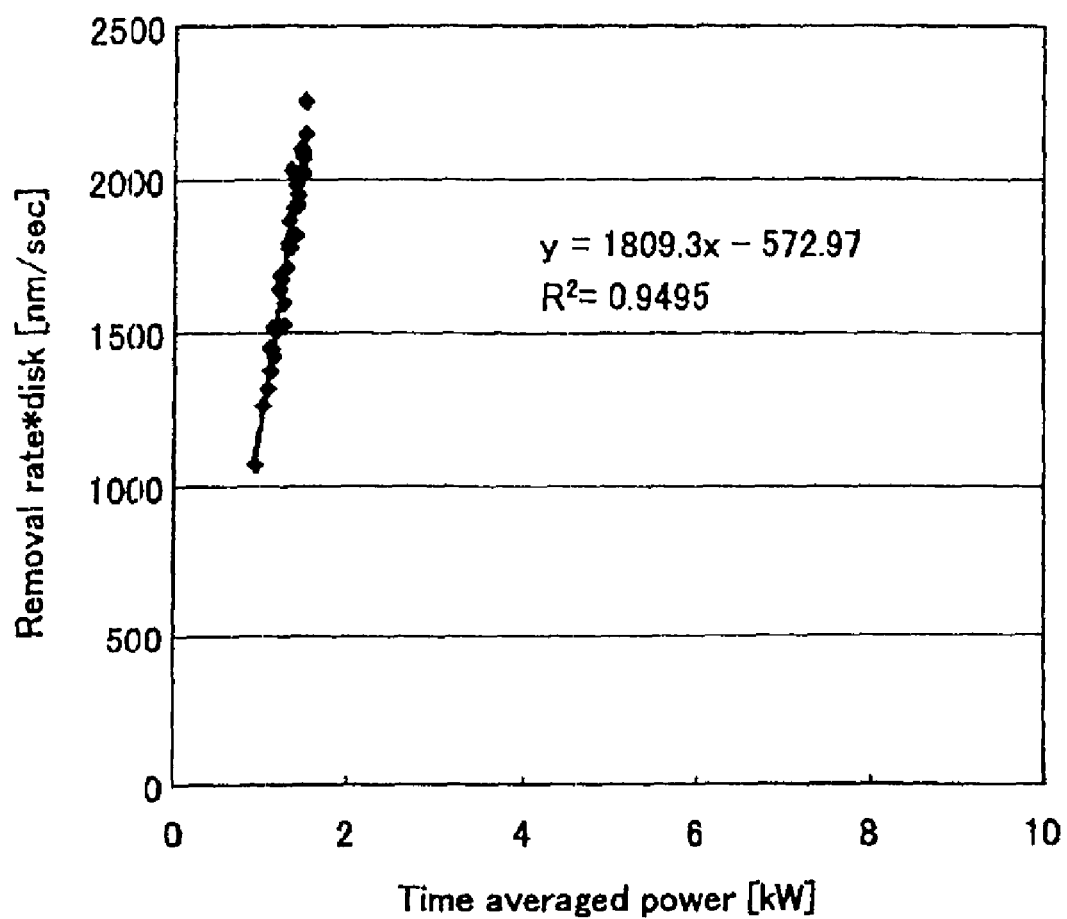
FIG. 7D is a graph showing a relationship between an average power in one driving motor (upper platen) and a value obtained by multiplying a polishing rate per one glass substrate by the number of glass substrates that are processed in one lot.

FIG. 7A shows a relationship between the second variable "NR" obtained when the glass substrates are polished by four driving motors (the upper platen+the lower platen+the sun gear+the internal gear) and a total sum obtained by summing up the first variables "U/t" of these four driving motors respectively. FIG. 7B shows a relationship between the second variable "NR" obtained when the glass substrates are polished by four driving motors (the upper platen+the lower platen+the sun gear+the internal gear) and a total sum obtained by summing up the first variables "U/t" of two driving motors (upper platen+lower platen). FIG. 7C shows a relationship between the second variable "NR" obtained when the glass substrates are polished by four driving motors (the upper platen+the lower platen+the sun gear+the internal gear) and the first variable "U/t" of one driving motor (the lower platen). FIG. 7D shows a relationship between the second variable "NR" obtained when the glass substrates are polished by four driving motors (the upper platen+the lower platen+the sun gear+the internal gear) and the first variable "U/t" of one driving motor (the upper platen).

As shown in FIG. 7A to FIG. 7D, it is appreciated that, even when the actual data are plotted, there is a linear correlation between the first variable "U/t" and the second variable "NR", as indicated by Equation (3). Therefore, when the regression analysis is applied to the relation between the actual data representing the first variable "U/t" and the actual data representing the second variable "NR", unknown first coefficient "1/UV" and unknown second coefficient "–P0/UV" can be calculated in respective terms. Equation (3) in which the coefficients are decided by the method of least squares is shown in FIG. 7A to FIG. 7D respectively (x denotes "U/t", y denotes "NR", and R2 denotes the decided coefficient).

It is shown that, as the decided coefficient R2 comes closer to 1, the correlation between the first variable "U/t" and the second variable "NR" becomes higher. Therefore, the correlation between the first variable "U/t" and the second variable "NR" becomes highest when the first variables "U/t" of four driving motors are summed up (i.e., the case in FIG. 7A). This result conforms to the consideration suggesting that the jobs of all motors are used for the polishing.

$$V = \frac{1}{N}\left(\frac{1}{U_V}U - \frac{P_0}{U_V}t\right) \quad (4)$$

Also, Equation (4) is the deformation of Equations (1) to (3). The first coefficient and the second coefficient derived by the regression analysis are substituted into Equation (4). The controlling unit 90 controls the rotating operation of the motors in accordance with Equation (4) in which the coefficients are decided, while monitoring the total electric energy U of the motor and the rotating time t of the motor during the rotation of the motors. For example, the controlling unit 90 substitutes the monitored data of the total electric energy U of the motor and the monitored data of the rotating time t of the motor into Equation (4), and thus continues the rotating operation of the motors until the amount of polishing V derived from Equation (4) reaches a target value VG of a predetermined amount of polishing V.

That is, according to Equation (4) in which the unknown first coefficient "1/UV" and the unknown second coefficient "–P0/UV" can be specified, a value of the number of sheets N of the glass substrates is set prior to the polishing, then a count of an elapsed time (rotating time t) and a calculation of the total electric energy U are continued from a point of time when the rotation of motors is started, and then the rotation of motors is stopped at a point of time when a value of the amount of polishing V, which is derived by Equation (4) into which these calculated values are substituted sequentially, reaches the necessary amount-of-polishing VG being set as the target value. As a result, the actual amount-of-polishing can be controlled to meet the target value VG extremely precisely.

Of course, either a total electric energy of the motor for the upper platen or the lower platen only or a sum of the total electric energies of the motors for the upper platen and the lower platen may be employed. A highest accuracy can be achieved when the first coefficient "1/UV" and the second coefficient "–P0/UV" are specified by using a sum of the total electric energies of four driving motors (the upper platen+the lower platen+the sun gear+the internal gear).

In this manner, in the polishing step of polishing the glass substrates by driving the motors provided to the polishing apparatus, the processing of the glass substrates can be controlled with high accuracy by performing the controlling operation to control the polishing of the glass substrates, based on the electric energy U necessary for the drive of the motors (i.e., the consumed electric energy U of the motors).

In order to control the processing of the glass substrates with high accuracy, the controlling operation for controlling the polishing of the glass substrates is performed during the driving of the motors based on the electric energy U. More concretely, the controlling operation for controlling the polishing of the glass substrates is performed during the driving of the motors based on the monitored data of the electric energy U and the monitored data in the rotating time t as the driving time of the motors.

The controlling operation for controlling the polishing of the glass substrates corresponds to the adjusting operation that is executed by the controlling unit 90 to adjust an amount of polishing of the glass substrate into a predetermined target value, for example, as described above. In the above-mentioned case, this adjusting operation corresponds to the driving operation that drives the motors while substituting sequentially the electric energy U and the rotating time t of the motors into Equation (4) during the driving of the motors until an amount of polishing V of the glass substrates derived from Equation (4) reaches the predetermined target value VG.

Next, control processes in the polishing step that the controlling unit 90 executes and procedures of the work that the worker performs will be explained with reference to flowcharts in FIG. 8A and FIG. 8B hereunder.

Figure 8A:
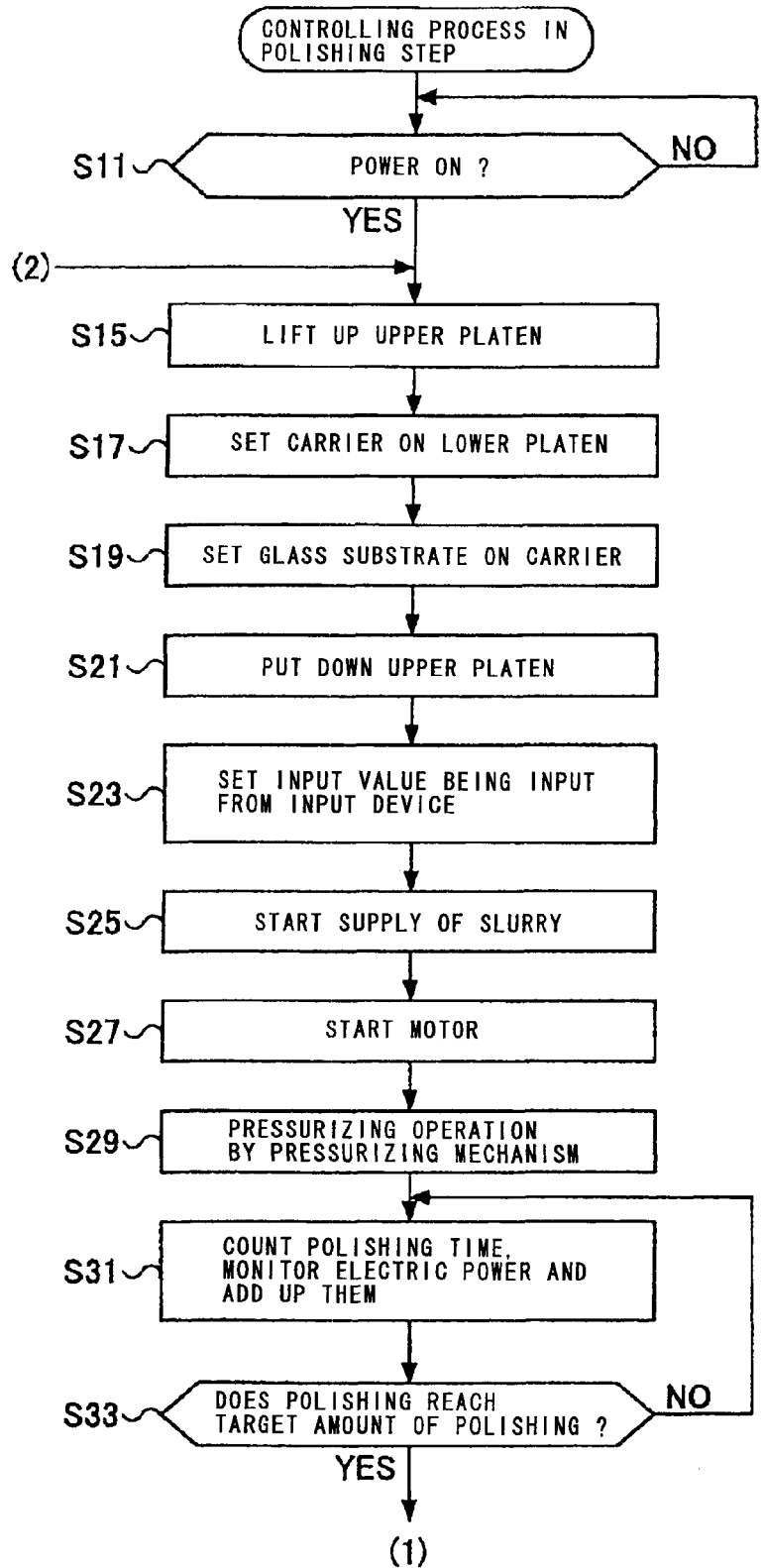
FIG. 8A is a flowchart explaining control processes in the polishing step that a controlling unit 90 executes and procedures of the work that a worker performs.

In S11 of FIG. 8A, the controlling unit 90 checks whether or not a power switch of the double-side polishing apparatus is turned ON. If the power switch is turned ON, the process goes to S15. In S15, the piston rod 54 is driven upward by increasing a supplied pressure P1 to a lower chamber of the elevating cylinder unit 52 (at this time, an upper chamber of the elevating cylinder unit 52 is opened into the atmosphere, and P2 is an atmospheric pressure), and thus the upper platen 40 as well as the suspending member 80 is lifted up (see FIG. 2A). Accordingly, the upper platen 40 is separated upwardly from the lower platen 30.

In next S17, the worker sets the carrier 160 on the upper surface of the lower platen 30. Then, in S19, the worker sets the glass substrate 200 in the housing holes 161 of the carrier 160 respectively.

In S21, the controlling unit 90 decreases a supplied pressure P1 to the lower chamber of the elevating cylinder unit 52 (at this time, an upper chamber of the elevating cylinder unit 52 is opened into the atmosphere, and P2 is an atmospheric pressure), and thus the piston rod 54 is driven downward (in the Zb direction) by an own weight of the upper platen 40 (see FIG. 2B). Accordingly, the upper platen 40 as well as the suspending member 80 falls up to the stroke end of the elevating cylinder unit 52. When the coupling holes 102 of the upper platen 40 are fitted on the coupling pins 63 of the coupling portion 62 respectively (see FIG. 1A) or when the key 81 coupled to the upper platen 40 is fitted into the key slot 62a of the coupling portion 62 (see FIG. 1B), the upper abrasive pad 220 arranged on the lower surface of the upper platen 40 comes into touch with respective upper surfaces of the glass substrates 200. In this state that the upper abrasive pad 220 comes into touch with the glass substrates 200, a pressure is applied to the upper surface of the glass substrates 200 by a mass of the upper platen 40 or by applying a predetermined pressure.

In S23, the controlling unit 90 sets an input value being input from the input device 330 as the polishing conditions at this time. As the input value, for example, the number N of sheets of the glass substrates, a starting plate thickness WS, and a target plate thickness WG are input. Then, the controlling unit 90 calculates the target amount-of-polishing VG of the glass substrate by subtracting the target plate thickness WG from the starting plate thickness WS (VG=WS−WG).

In S25, the controlling unit 90 supplies the slurry from the upper platen 40 side (e.g., from a plurality of holes opened in the upper platen 40). Then, the process goes to S27, where motor driving powers are transferred to the lower platen 30 and the upper platen 40 by starting the motors M1 to M4.

In S29, the controlling unit 90 causes the pressure applying mechanism 120 to start the pressurizing operation immediately after the polishing is started. Accordingly, the upper abrasive pad 220 mounted on the lower surface of the upper platen 40 is brought into tight contact with the upper surfaces of the glass substrates 200 being held in the carriers 160 at a predetermined pressure by the pressurizing operation of the pressure applying mechanism 120.

For example, in the case of the double-side polishing apparatus 10 shown in FIG. 1A, in S29, the controlling unit 90 supplies a compressed air into an air bag of the pressure applying mechanism 120 immediately after the polishing is started. When a compressed air is supplied into an air bag, the air bag fills out downward. Then, the upper abrasive pad 220 mounted on the lower surface of the upper platen 40 is brought into tight contact with the upper surfaces of the glass substrates 200 being held in the carriers 160 by a pressure of the air bag.

In next S31, the controlling unit 90 counts a polishing time as the rotating time of the motors (platen rotation driving time), and then calculates an accumulated value of electric power (i.e., electric energy) from a point of time when the rotation of the motors is started, by monitoring the electric power. In S33, the controlling unit 90 decides whether or not an amount of polishing derived by Equation (4) reaches the target amount-of-polishing VG. If an amount of polishing does not reach the target amount-of-polishing VG, the controlling unit 90 still continues the process in S31.

Figure 8B:
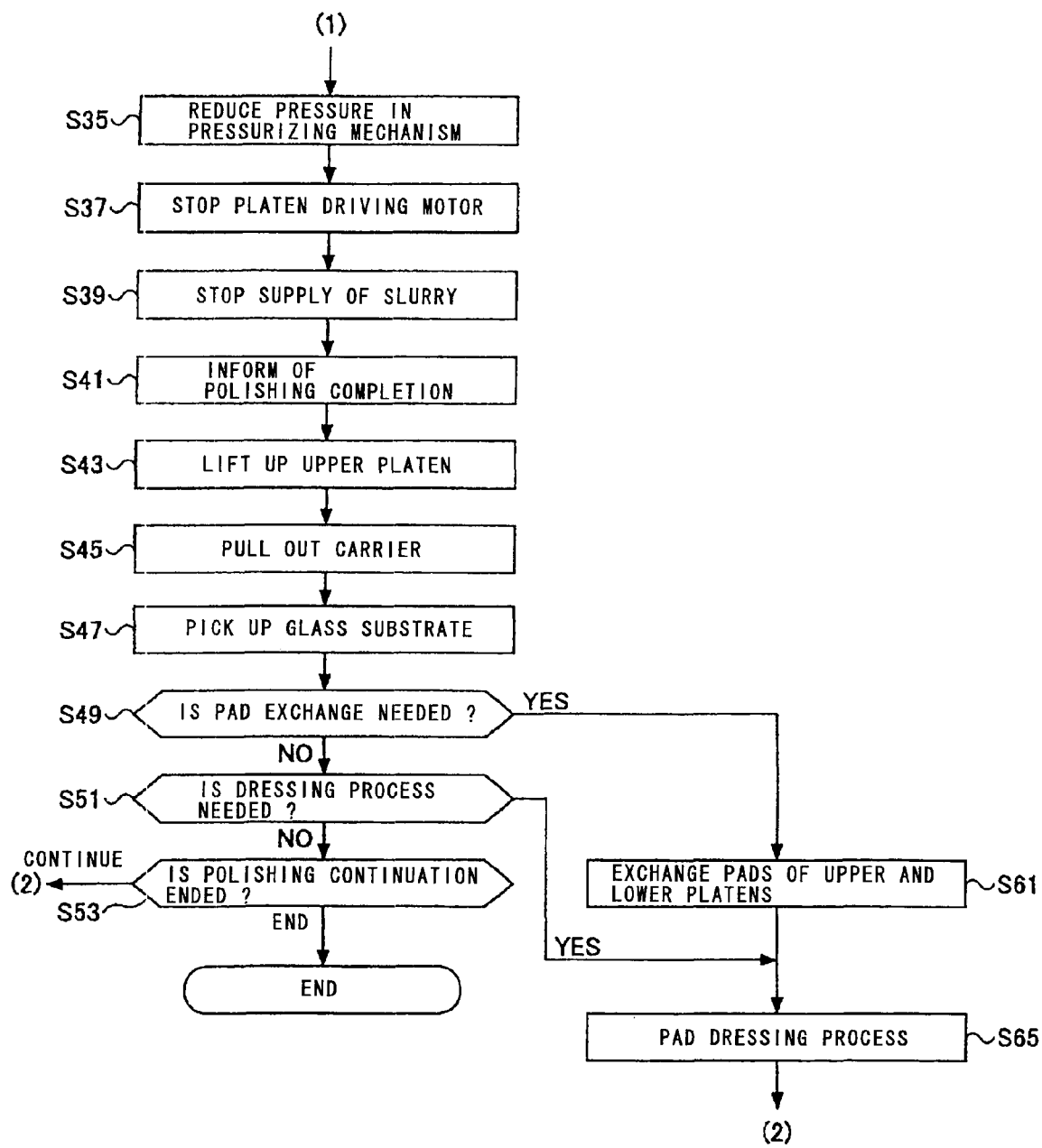
FIG. 8B is a flowchart explaining control processes that are executed subsequently to the control processes in FIG. 8A and procedures of the work that a worker performs.

In S33, if an amount of polishing reaches the target amount of polishing VG, the process goes to S35 in FIG. 8B. In S35, the controlling unit 90 causes the pressure applying mechanism 120 to reduce a pressure to terminate the polishing of the glass substrates. The polishing of the glass substrates is ended by releasing the pressurizing operation by the pressure reducing operation.

For example, in the case of the double-side polishing apparatus 10 shown in FIG. 1A, if an amount of polishing reaches the target amount-of-polishing VG in S33, the process goes to S35 in FIG. 8B. The compressed air in the air bag of the pressure applying mechanism 120 is exhausted, and the pressure in the air bag is reduced to the atmospheric pressure. Thus, the application of pressure by the air bag is released to terminate the polishing of the glass substrates. The polishing of the glass substrates is ended by releasing the pressurizing operation executed by the air bag.

In S33, the polishing of the glass substrates may be stopped by releasing the pressure application of the pressure applying mechanism 120 at a point of time when an amount of polishing V derived sequentially by Equation (4) reaches the target amount-of-polishing VG. Otherwise, the polishing of the glass substrates may be stopped after the pressure applied by the pressure applying mechanism 120 is reduced stepwise, or the polishing of the glass substrates may be stopped by stopping the rotation of the motors.

In next S37, a power feeding to the driving motors M1 to M4 is stopped to reduce a rotating torque to zero. Then, in S39, the supply of slurry is stopped.

In next S41, the controlling unit 90 informs that the polishing is completed, by a voice guidance or a monitor display using of the informing means 310.

Then, the process goes to S43. Then, the piston rod 54 is operated upward by increasing a supplied pressure P1 to a lower chamber of the elevating cylinder unit 52 (at this time, an upper chamber of the elevating cylinder unit 52 is opened into the atmosphere, and P2 is an atmospheric pressure), and thus the upper platen 40 is moved upward (in the Za direction) over the lower platen 30 (see FIG. 2A). A plurality of glass substrates 200 whose polishing is completed and the carriers 160 can be picked up when the upper platen 40 is moved upward in this manner.

In next S45, the worker pulls out the carriers 160 from the lower platen 30. Then, in S47, the worker picks up all glass substrates 200 whose polishing is completed from the lower platen 30.

In next S49, the worker decides whether or not the clogging is caused in the lower abrasive pad 210 and the upper abrasive pad 220, and then checks whether or not the pad exchange is needed.

In this case, it may be decided based on an accumulated value of the polishing time, the number of times of the polishing step, a depth measurement of the pad groove executed by the worker, or the like, for example, whether or not the pad should be exchanged depending on an extent of the clogging of the lower abrasive pad 210 and the upper abrasive pad 220. Also, such pad exchange may be decided based on an electric power or an electric energy of the motors.

Also, in S49, if the worker decides that the clogging is caused in the lower abrasive pad 210 and the upper abrasive pad 220, such worker chooses either the pad exchange is needed or the dressing is needed. If the worker decided that the pad exchange is needed, the process goes to S61.

Then, if the worker decided that the pad exchange is not needed, such worker checks in S51 whether or not the dressing process of the lower abrasive pad 210 and the upper abrasive pad 220 is needed. If the dressing process is not needed, the worker checks in S53 whether or not the polishing should be continued. In S53, if the polishing is continues subsequently, the process goes back to foregoing S15. Procedures subsequent to S15 are repeated.

Then, in S61, the worker removes the upper abrasive pad 220 from the upper platen 40. Then, the worker fits the new upper abrasive pad 220 to the lower surface of the upper platen 40. Also, the worker can exchange the lower abrasive pad 210 mounted on the lower platen 30. In the case of the double-side polishing apparatus, from a viewpoint of stabilization of polishing accuracy, and the like, it is preferable that the abrasive pad should be exchanged on both upper and lower sides at the same time.

Then, the process goes to S65, where the worker applies the pad dressing process to the lower abrasive pad 210 and the upper abrasive pad 220. That is, the worker causes the elevating cylinder unit 52 to lift up the upper platen 40, and sets the dress carrier over the lower platen 30 and causes the elevating cylinder unit 52 to fall to a dressing height position. The dressing process is carried out while applying a predetermined pressure in a state that the upper platen 40 falls in the dressing height position. At this time, the piston rod 54 of the elevating cylinder unit 52 may be restricted in a dropped position by the stopper plate 324 of the dress-positioning stopper mechanism 320 (see FIG. 1A), and may be positioned in a position where the upper platen 40 is lifted up by a thickness of the dress carrier. The diamond dresser is fitted to the dress carrier, and the pad surfaces of the lower abrasive pad 210 and the upper abrasive pad 220 are put in order by the diamond dresser.

After the pad dressing process is ended, the worker causes the elevating cylinder unit 52 to lift up the upper platen 40, and takes off the dress carrier. After this, the process goes back to above S15, and respective processes subsequent to S15 are repeated.

Also, in S51, if it is decided that the dressing process of the lower abrasive pad 210 and the upper abrasive pad 220 is needed, the process goes to foregoing S65, where the worker applies the pad dressing process to the lower abrasive pad 210 and the upper abrasive pad 220. After this, the process goes back to above S15, and respective processes subsequent to S15 are repeated.

Here, in the polishing step shown in FIG. 8A and FIG. 8B, the controlling unit 90 may control the processing operation (controlling operation) based on monitored data of the total electric energy U during the rotation of the motors as the monitored subject, while monitoring the total electric energy U of at least any one of the motors M1 to M4 during the rotation of the motors.

Also, the controlling unit 90 may not only adjust an amount of polishing of the glass substrates but also control the processing operation (controlling operation), which affects the polishing of the glass substrates, based on the monitored data of the total electric energy U (or the total electric power P) and the rotating time t during the rotation of the motor as the monitored subject, while monitoring the total electric energy U (or the total electric power P) of at least any one of the motors M1 to M4 and the rotating time t of the motor during the rotation of the motors.

Accordingly, the processing of the glass substrates can be controlled with high accuracy. For example, it can be prevented that accuracy of an amount of polishing of the glass substrate is varied.

For example, the controlling operation applied to control the polishing of the glass substrate based on the electric energy U (or the electric power P) necessary for the driving of the motor may be executed as the controlling operation that is applied to control the dressing process of the upper and lower abrasive pads based on the electric energy U (or the electric power P). For example, a deciding operation of deciding an executing time of the dressing process of the abrasive pads based on the electric energy U (or the electric power P) may be applied. Also, a deciding operation of deciding an exchange timing of the abrasive pads based on the electric energy U (or the electric power P) may be applied. Also, a deciding operation of deciding an exchange timing of the abrasive slurry based on the electric energy U (or the electric power P) may be applied. Also, a deciding operation of deciding an amend timing of the platens such as the upper platen, the lower platen, etc. based on the electric energy U (or the electric power P) may be applied. Also, a detecting operation of detecting cracks of the glass substrate during the polishing based on the electric energy U (or the electric power P) may be applied, or a stopping operation of stopping the polishing of the glass substrate after the cracks of the glass substrate are detected during the polishing may be applied. Also, a deciding operation of deciding troubles of the polishing apparatus or the component that is provided to the polishing apparatus and related to the polishing (e.g., the solenoid valve for controlling the polishing operation of the glass substrate, or the like) based on the electric energy U (or the electric power P) may be applied, or a predicting operation of predicting an occurrence of the trouble may be applied. For example, a deciding operation of deciding an exchange timing of the solenoid valve based on the electric energy U (or the electric power P) may be applied, or a predicting operation of predicting an occurrence of the trouble of the solenoid valve may be applied.

The controlling unit 90 decides a period subsequent to a point of time when the electric energy U (or the electric power P) that is in excess of a predetermined first threshold value (or is less than a predetermined second threshold value that is lower than the first threshold value) is measured, for example, as an executing time of the dressing process, an exchange timing of the abrasive pads, or an exchange timing of the abrasive slurry. When a predetermined working such as the dressing process, the exchange, or the like of the abrasive pad is executed according to this decided result, a polishing rate R of the glass substrate can be stabilized. Also, the polishing quality can be stabilized by improving the characteristic of the glass substrate to be polished (e.g., surface waving, surface roughness, peripheral end surface shape (hanging), or the like). Also, the polishing quality can be stabilized by eliminating the defect of the glass substrate to be polished.

Also, the controlling unit 90 decides a period subsequent to a point of time when the electric energy U (or the electric power P) that is in excess of a predetermined first threshold value (or is less than a predetermined second threshold value that is lower than the first threshold value) is measured, for example, as an amending period the platen such as the upper platen, the lower platen, or the like, an executing time of the dressing process, an exchange timing of the abrasive pads, or an exchange timing of the abrasive slurry. When a predetermined working such as the amendment of the platen, the dressing process, the exchange, or the like is executed according to this decided result, the characteristic of a degree of flatness of the glass substrate to be polished can be improved, and also the polishing quality can be stabilized.

Also, when a variation level of the electric energy U (or the electric power P) per unit time, which is in excess of a predetermined value, is measured, for example, the controlling unit 90 decides that the glass substrate being in the polishing is cracked, and stops the polishing of the glass substrates. Accordingly, the stabilization of production of the glass substrates can be achieved.

Also, when the electric energy U (or the electric power P), which is in excess of a predetermined value, is measured, for example, the controlling unit 90 decides that the polishing apparatus or the component that is provided to the polishing apparatus and related to the polishing is defected. Otherwise, the controlling unit 90 decides that an occurrence of the failure is predicted. When the exchange of the concerned component, or the like is done immediately after the failure or before the failure according to this decided result, the stabilization of production of the glass substrates can be achieved.

The controlling unit 90 may execute the controlling operation, which controls the rotating operation of the motor, as the controlling operation applied to control the polishing of the glass substrates, based on at least any one of the total electric energy U (or the total electric power P) during the rotation of the motors and the rotating time t. For example, when an increasing rate of the total electric energy U (or the total electric power P) per unit time is less than a predetermined value, the controlling unit 90 stops the rotating operation of the motors. Unless the total electric power P or the total electric energy U whose value is increased by accumulating the electric power reaches a predetermined threshold value within a predetermined time, the controlling unit 90 decides that any trouble happens. Thus, the controlling unit 90 stops the rotating operation of the motors, so that such a situation can be prevented that an error is caused in an amount of polishing of the glass substrates and also an occurrence or escalation of the abnormality can be prevented beforehand.

Alternately, the controlling unit 90 applies the control by adjusting (increasing or decreasing) the process pressure of the polishing such that the total electric power P or the total electric energy U whose value is increased by accumulating the electric power reaches a predetermined threshold value within a predetermined time. Therefore, a reduction of productivity in the polishing step can be prevented, and also variation in an amount of polishing can be suppressed.

The controlling unit 90 may execute the controlling operation, which controls an informing operation that calls upon the worker to execute the pad dressing process (see S65 in FIG. 8B), as the controlling operation applied to control the polishing of the glass substrates, based on at least any one of the total electric energy U (or the total electric power P) during the rotation of the motors and the rotating time t. For example, when the clogging is caused in the abrasive pads in a situation that the total electric energy U (or the total electric power P) that is less than a predetermined value is measured, the controlling unit 90 may consider that a polishing rate is lowered and also an electric power is decreased. Therefore, the controlling unit 90 starts the informing operation that calls upon the worker to execute the pad dressing process. Accordingly, an occurrence of an error in an amount of polishing of the glass substrates can be prevented because an uncompleted state of the dressing process is continued, and the worker can be informed appropriately of an applying timing of the dressing process.

The controlling unit 90 may execute the controlling operation, which controls the informing operation that calls upon the worker to execute the pad exchange (see S49 in FIG. 8B), as the controlling operation applied to control the polishing of the glass substrates, based on at least any one of the total electric energy U (or the total electric power P) during the rotation of the motors and the rotating time t. For example, when the clogging is caused in the abrasive pads in a situation that the total electric energy U (or the total electric power P) that is less than a predetermined value is measured, the controlling unit 90 may consider that a polishing rate is lowered and also an electric power is decreased. Therefore, the controlling unit 90 starts the informing operation that calls upon the worker to execute the pad exchange. Accordingly, an occurrence of an error in an amount of polishing of the glass substrates can be prevented because an uncompleted state of the pad exchange is continued, and the worker can be informed appropriately of an applying timing of the pad exchange.

The controlling unit 90 may execute the controlling operation, which controls the informing operation that calls upon the worker to amend the upper platen or the lower platen, as the controlling operation applied to control the polishing of the glass substrates, based on at least anyone of the total electric energy U (or the total electric power P) during the rotation of the motors and the rotating time t. For example, when the total electric energy U (or the total electric power P) that is in excess of a predetermined value is measured, the controlling unit 90 starts the informing operation that calls upon the worker to amend the platen. Accordingly, an occurrence of an error in an amount of polishing of the glass substrates can be prevented because an uncompleted state of the platen amendment is continued, and the worker can be informed appropriately of an applying timing of the platen amendment.

The controlling unit 90 may execute the controlling operation, which controls the informing operation that calls upon the worker to exchange the slurry (see S25 in FIG. 8A, S39 in FIG. 8B), as the controlling operation applied to control the polishing of the glass substrates, based on at least any one of the total electric energy U (or the total electric power P) during the rotation of the motors and the rotating time t. For example, when the clogging is caused in the abrasive pads in a situation that the total electric energy U (or the total electric power P) that is less than a predetermined value is measured, the controlling unit 90 may consider that a polishing rate is lowered and also an electric power is decreased. Therefore, the controlling unit 90 starts the informing operation that calls upon the worker to exchange the slurry. Accordingly, an occurrence of an error in an amount of polishing of the glass substrates can be prevented because an uncompleted state of the slurry exchange is continued, and the worker can be informed appropriately of an applying timing of the slurry exchange.

The controlling unit 90 may execute the controlling operation, which controls the informing operation that informs the worker of the abnormality of the polishing apparatus such as the double-side polishing apparatus 10, 11, or the like, as the controlling operation applied to control the polishing of the glass substrates, based on at least any one of the total electric energy U (or the total electric power P) during the rotation of the motors and the rotating time t. For example, when the total electric energy U (or the total electric power P) that is in excess of a predetermined value is measured, the controlling unit 90 starts the informing operation that informs the worker of the abnormality of the polishing apparatus. Accordingly, an occurrence of an error in an amount of polishing of the glass substrates can be prevented because a state that the abnormality of the polishing apparatus is left, as it is, is continued, and the worker can be informed appropriately of an occurrence of abnormality of the polishing apparatus.

In this manner, according to the above embodiment, the polishing process of the glass substrates can be controlled with high accuracy not to take a labor and a high cost, and the glass substrates that are excellent in quality stability can be provided with high productivity.

The above embodiments show the double-side polishing apparatus. But the embodiment of the present invention may be applicable to the single-side polishing apparatus or the polishing apparatus for the substrate-side surface (peripheral end surface).

As the glass substrate of the embodiment of the present invention, the glass substrate for the magnetic recording medium or the glass substrate for the photomask may be employed. Also, the glass substrate for the display such as the liquid crystal, the organic EL, or the like may be employed or the glass substrate for the optical component such as the lens, the optical filter, the optical pickup element, or the like may be employed. Also, the semiconductor substrate (the silicon substrate, the silicon carbide substrate, or the like) may be employed.

As the glass substrate of the embodiment of the present invention, the amorphous glass, the crystallized glass, or the chemically strengthened glass may be employed. Also, the glass element substrate of the glass substrate of the embodiment of the present invention may be formed by the float method or the press forming method.

The double-side polishing apparatus as the embodiment of the present invention is the 4-way type in which the glasses are polished by the driving powers generated by the rotation of four motors. In this case, the 1-way type in which the glasses are polished by the driving power generated by the rotation of one motor, the 2-way type in which the glasses are polished by the driving powers generated by the rotation of two motors, or the 3-way type in which the glasses are polished by the driving powers generated by the rotation of three motors may be employed. Also, the polishing apparatus for polishing the glasses by the driving powers generated by the rotation of four motors or more may be employed.

The double-side polishing apparatus in the 2-way type is of the type that the upper and lower platens are fixed not to rotate, the work is held in the carrier, which engages with both the internal gear and the sun gear both being rotated by the turning/driving of the motors, and the work is polished under the polishing pressure that is applied to sandwich the work between both platens. The double-side polishing apparatus in the 3-way type is of the type that the lower platen is also rotated by the turning/driving of the motors, in addition to the internal gear and the sun gear.

The CMP polishing apparatus is of the type that consists of the platen on which the pad is stretched and the holder for holding the work, and the holder is rotated and swung while pushing the work against the rotating pad by a predetermined pressure. The CMP polishing apparatus has a first motor for rotating the platen, a second motor for rotating the holder, and a third motor for swinging the holder.

The side-surface polishing apparatus for polishing the peripheral end surface of the glass substrate has a first motor for rotating the abrasive tool such as the abrasive brush, the abrasive pad, etc., a second motor for swinging the polishing tool such as the abrasive brush, the abrasive pad, etc., and a third motor for rotating the glass substrate as the work.

Also, the polishing of the glass substrate is performed by the driving power generated by the drive of the motor. In this case, the polishing apparatus of the present invention may polish the glass substrate by turning the polishing substrate by the rotating operation of the motor or may polish the glass substrate by moving reciprocally the polishing substrate by the driving operation of the motor.

The present invention will be further explained by showing Example and Comparative Example hereunder, but the present invention is not limited to this example at all. In the present Example, the double-side polishing apparatus 11 having the key structure shown in FIG. 1B is employed.

Figure 9A:
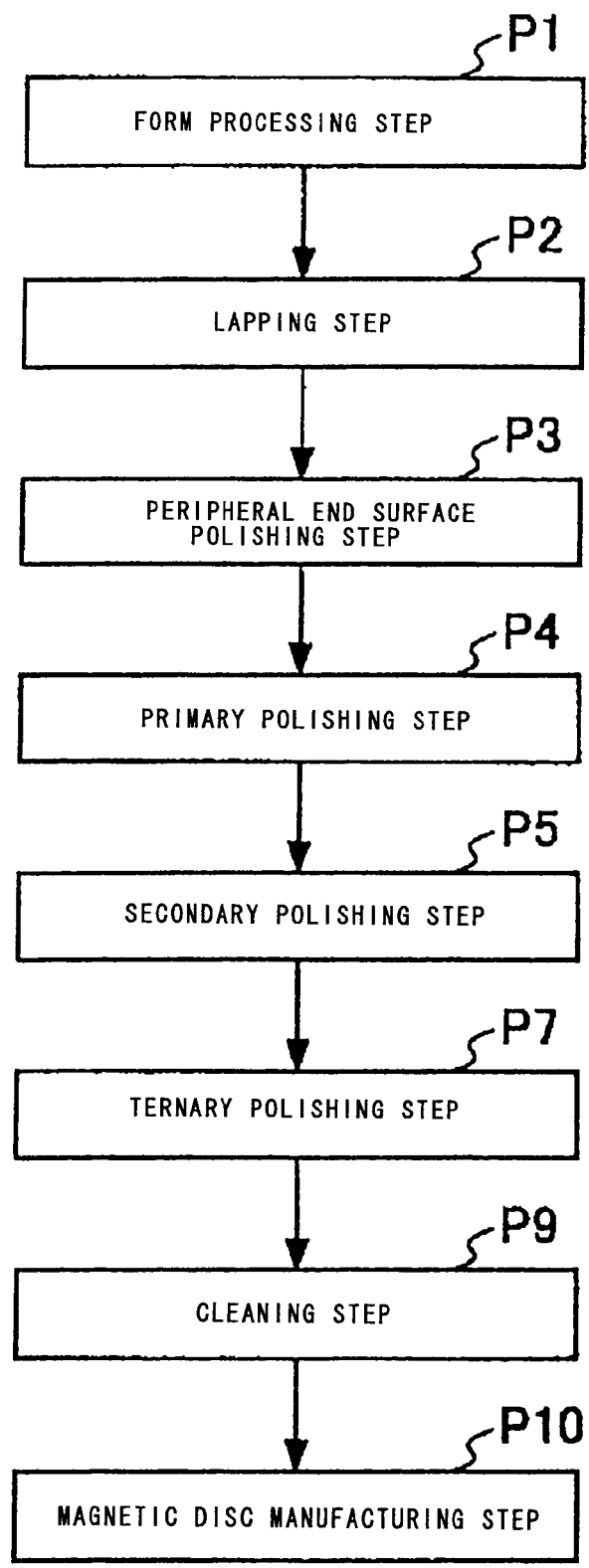
FIG. 9A is a flowchart showing a first example of the steps of manufacturing a glass substrate for a magnetic recording medium and a magnetic disc.

FIG. 9A is a flowchart showing a first example of the steps of manufacturing the magnetic recording medium glass substrate and the magnetic disc. The steps from P1 to P9 correspond to the steps of manufacturing the magnetic recording medium glass substrate. At the end stage of the step P9, the magnetic recording medium glass substrate as the first final product is manufactured. The magnetic disc as the second final product is manufactured by applying the magnetic disc manufacturing step P10 to the magnetic recording medium glass substrate.

(Form Processing Step P1)

The silicate glass plate formed by the float method is processed into a donut-like circular glass plate (circular-disc glass plate having a circular hole in a center portion) from which the magnetic disc glass substrate having an outer diameter of 65 mm, an inner diameter of 20 mm, and a plate thickness of 0.635 mm can be obtained. The chamfering process is applied to the inner peripheral side surface and the outer peripheral side surface of this donut-like circular glass plate to have a chamfering width of 0.15 mm and a chamfering angle of 45°.

(Lapping Step P2)

Then, the lapping of the upper and lower surfaces of the glass plate is executed by using the aluminum oxide abrasive grains, and the abrasive grains are cleaned/removed.

(Peripheral End Surface Polishing Step P3)

Then, the inner peripheral side surface and the inner peripheral chamfered portion and the outer peripheral side surface and the outer peripheral chamfered portion are polished by using the abrasive brush and the cerium oxide abrasive grains, and then the scars on the inner peripheral side surface and the inner peripheral chamfered portion and the outer peripheral side surface and the outer peripheral chamfered portion are removed and these surfaces are processed to get a mirror surface. The abrasive grains are cleaned/removed from the glass substrate, which was subjected to the outer peripheral end surface polishing, by the scrub cleaning using Bellclean and an alkali cleaner, and the ultrasonic cleaning applied in a state that the glass substrate is dipped into the alkaline cleaner solution.

(Primary Polishing Step P4)

The polishing process of the upper and lower main planes is executed by the double-side polishing apparatus, while using the abrasive liquid that contains the rigid urethane pad and the cerium oxide abrasive grains (the abrasive liquid composite that contains the cerium oxide whose average particle diameter is about 1.4 μm, as a main component) as the polishing tool. As the double-side polishing apparatus, the 22B type manufactured by Speed Fam Corporation is employed, and the polishing process is applied to 200 sheets of glass substrate in one lot (N=200 in Equation (4)).

In order to compare Examples of the present invention with Comparative Example (conventional method), the measurement of an amount of polishing is carried out by using the precision electronic force balance (A & D Company Limited, Type FX-120i), and by measuring an amount of change in mass obtained before and after the polishing process (the mass law). A plate thickness (amount of polishing) removed in the polishing process is calculated by dividing an amount of change in mass obtained before and after the polishing process by a specific gravity and areas of both main planes (area of a main plane×2). The measurement of an amount of polishing is carried out by using 6 sheets of glass substrate in one lot.

Prior to the polishing process, masses of 6 sheets of glass substrate for the amount-of-polishing measurement is measured by the precision electronic force balance. The polishing process is applied to 6 sheets of glass substrate, a mass of which is measured respectively, as well as other glass substrates in a state that 3 sheets are arranged on the inner peripheral side of the glass substrate holding jig (the carrier) and 3 sheets are arranged on the outer peripheral side of the same.

A program of stopping automatically the polishing process at a point of time when the amount of polishing V derived by Equation (4) reaches the target amount-of-polishing VG (=the starting plate thickness WS−the target plate thickness WG) being input via the input device 330 prior to the polishing process is installed into the polishing apparatus.

The target amount-of-polishing VG and the number of sheet of substrates N (=200) are input into the polishing apparatus via the input device 330 prior to the polishing process, and an electric power of the driving motors of the polishing apparatus during the polishing process is accumulated every one second. Thus, an electric power accumulated value U of the driving motor of the polishing apparatus is obtained every one second. In the polishing apparatus used in this Example, four driving motors (the upper platen+the lower platen+the sun gear+the internal gear) are equipped, and the electric power accumulated value U of the driving motor is recorded for all four driving motors.

The abrasive grains are cleaned/removed from the glass substrate, which was subjected to the outer peripheral end surface polishing, by the scrub cleaning using Bellclean and an alkali cleaner, and the ultrasonic cleaning applied in a state that the glass substrate is dipped into the alkaline cleaner solution. After the cleaning, 6 sheets of glass substrate whose mass is measured before the polishing are dried by the air blow until a moisture is removed completely. A mass of the dried glass substrate is measured by the precision electronic force balance, and a mass of the glass substrate after the polishing process is measured. A plate thickness (amount of polishing) removed by the polishing process is calculated from an amount of change of mass before and after the polishing process.

Figure 10A:
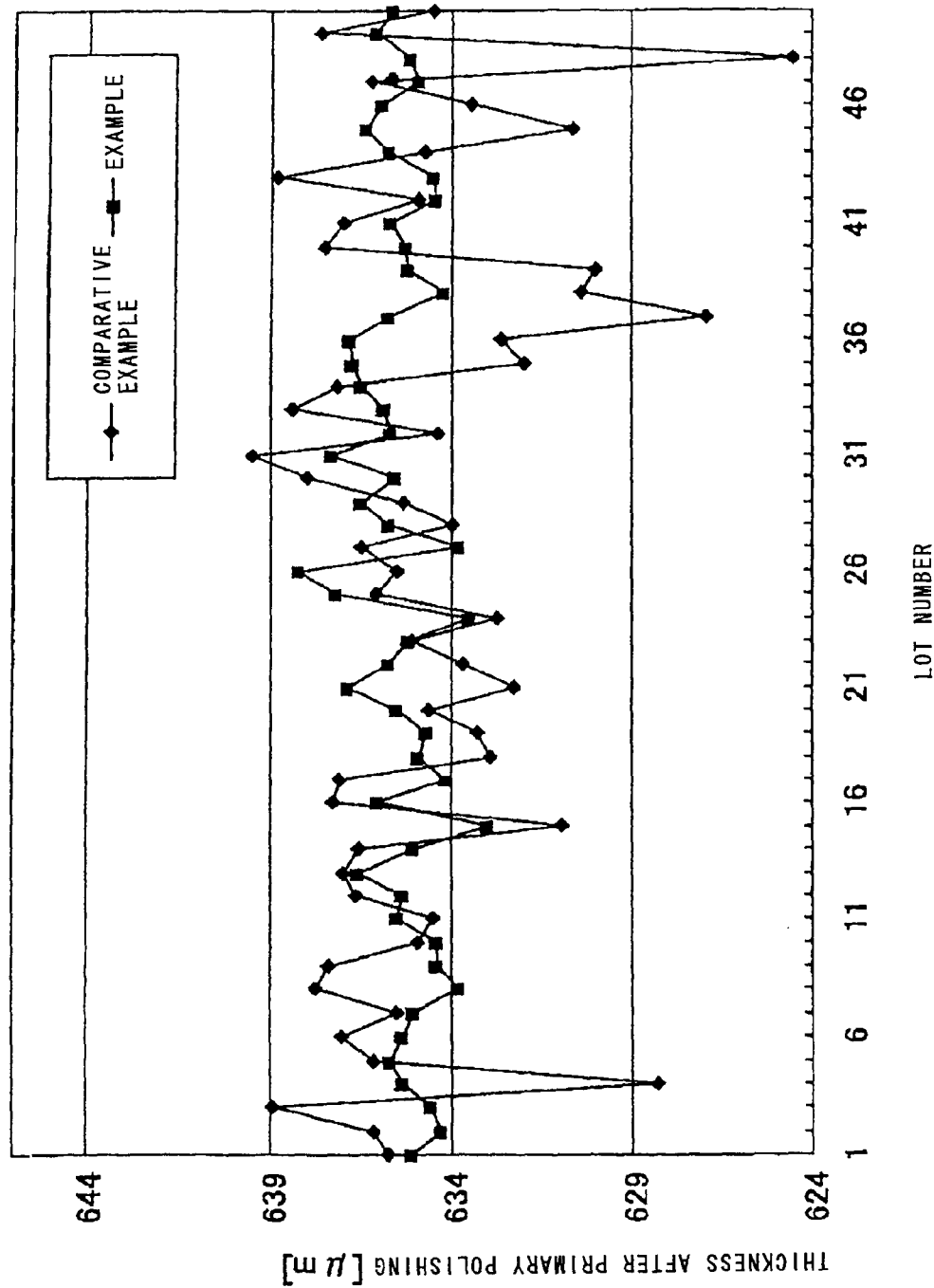
FIG. 10A is a view showing measured results of a thickness of the glass substrate after the primary polishing is ended.

The measured results obtained when the polishing process is applied in accordance with Equation (4) by using the polishing apparatus, in which the polishing method of the present invention is set, while monitoring the electric power accumulated value U and a time t (Example) and the measured results obtained when the polishing process is applied by using the above conventional method (1) (Comparative Example) are shown in FIG. 10A and FIG. 10B.

A variation (a plate thickness variation dimensional range) of the plate thickness average value (detected by using 6 sheets of glass substrate in each lot) in each lot when the polishing process is applied successively to 50 lots by the same polishing apparatus is suppressed to 5.2 μm. This variation is improved largely in contrast to the plate thickness average variation dimensional range of 15.0 μm obtained when the polishing process is applied by controlling an amount of polishing based on the conventional method. It is confirmed that the polishing process can be applied by using the polishing method of the present invention, while controlling the plate thickness after the polishing process with high accuracy.

(Secondary Polishing Step P5)

The polishing process of the upper and lower main planes is applied to the glass substrate, which is subjected to the primary polishing process, by the double-side polishing apparatus, while using the abrasive liquid that contains the rigid urethane pad and the cerium oxide abrasive grains oxide whose average particle diameter is smaller than that of the cerium oxide (the abrasive liquid composite that contains the cerium oxide whose average particle diameter is about 0.5 μm, as a main component) as the polishing tool. Then, the cerium oxide is cleaned/removed. An amount in the polishing process is 4 μm in total in the thickness direction of the upper and lower surfaces.

(Ternary Polishing Step P7)

Then, the polishing process of the upper and lower main planes is applied by the double-side polishing apparatus, while using the abrasive liquid that contains the rigid urethane pad and the colloidal silica (the abrasive liquid composite that contains the colloidal silica whose average particle diameter of the primary particles is 20 to 30 nm, as a main component) as the polishing tool for the finishing polishing. The polishing process is applied by 1 μm in total in the thickness direction of the upper and lower surfaces.

Figure 11:
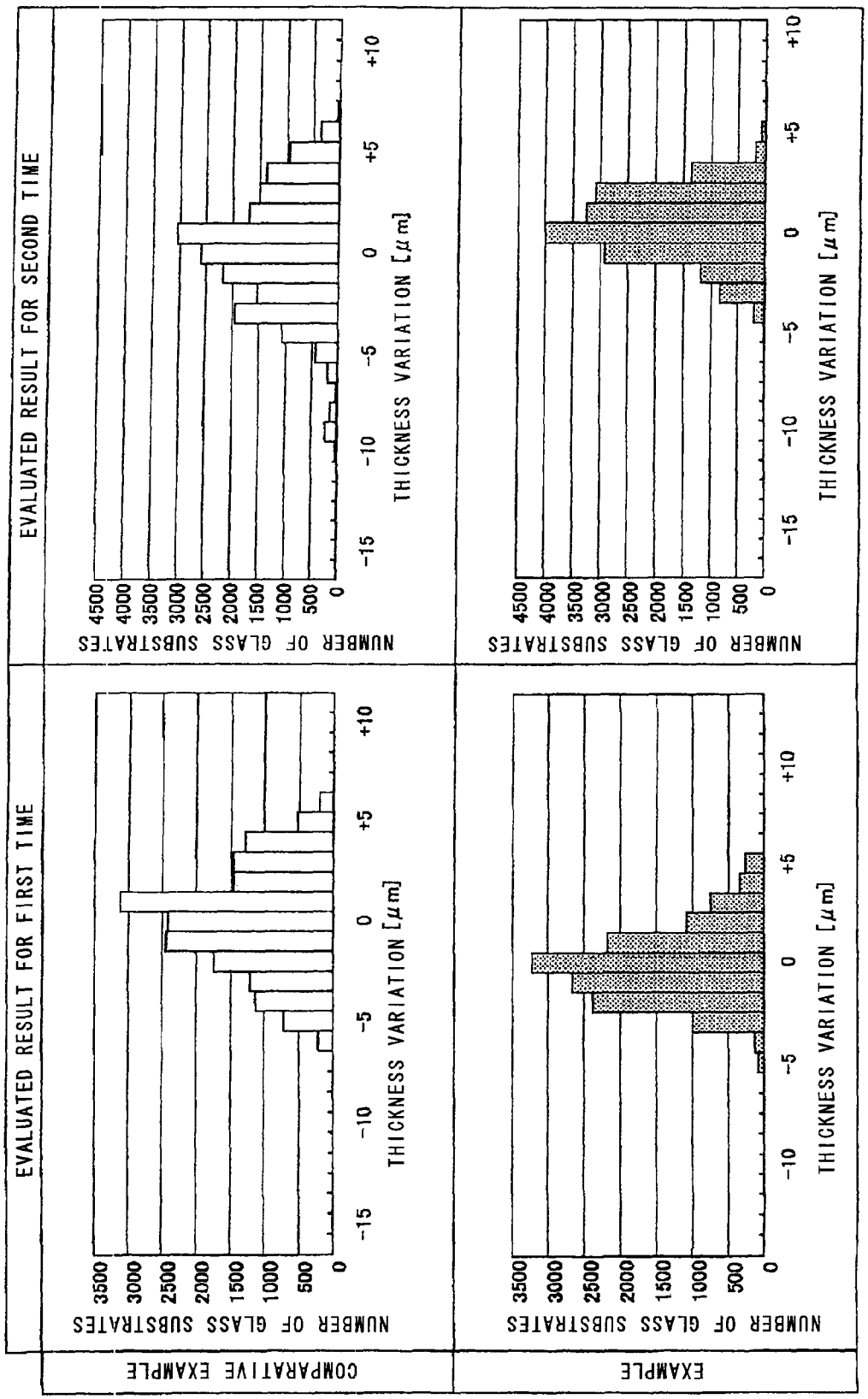
FIG. 11 is a view showing measured results of a thickness of the glass substrate after the ternary polishing is ended.

As shown in FIG. 11, a plate thickness variation of the glass substrate, which is subjected to the ternary polishing after the primary polishing is applied by the method of the present invention based on the electric power accumulate value U and the time t while adjusting an amount of polishing according to Equation (4), is suppressed within ±5 μm (plate thickness variation range of 10 μm). A plate thickness variation of the glass substrate, which is subjected to the ternary polishing after the primary polishing is applied by the conventional method is within ±8.5 μm (plate thickness variation range of 17 μm). An abscissa in FIG. 11 denotes a deviation from the target plate thickness. Also, in FIG. 11, the data of evaluated results for the second time in Comparative Example show a plate thickness variation of the glass substrate in each lot when 90 lots (17927 sheets) are polished successively by the same polishing apparatus. The data of evaluated results for the second time in Comparative Example show a plate thickness variation of the glass substrate in each lot when 97 lots (19276 sheets) are polished successively by the same polishing apparatus. The data of evaluated results for the first time in Example show a plate thickness variation of the glass substrate in each lot when 76 lots (14097 sheets) are polished successively by the same polishing apparatus. The data of evaluated results for the second time in Example show a plate thickness variation of the glass substrate in each lot when 86 lots (17065 sheets) are polished successively by the same polishing apparatus.

A plate thickness variation in the magnetic recording medium glass substrate (the magnetic disc glass substrate prior to the film formation) as the final product is suppressed by executing the primary polishing while controlling an amount of polishing by the method of the present invention. The glass substrate whose plate thickness is controlled with high accuracy can be obtained.

A plate thickness or an amount of polishing measurement after the ternary polishing is executed about all numbers of sheets in one lot, by using the CCD laser displacement meter (manufactured by KEYENCE CORPORATION, the laser head LK-G15/the amplifier LK-G3000 V). The measurement is done at the intermediate portion in the recording/reproducing area of the magnetic recording medium glass substrate as the measuring location.

(Cleaning Step P9)

The donut-like circular glass plate after the finishing polishing is dipped in the solution whose pH is adjusted equally to the polishing liquid for the finishing polishing. Then, the scrub cleaning using Bellclean and the alkali cleaner, the ultrasonic cleaning applied in a state that the glass substrate is dipped into the alkaline cleaner solution, and the ultrasonic cleaning applied in a state that the glass substrate is dipped into a pure water are executed sequentially. Then, the glass substrate is dried by the IPA steam.

An arithmetic mean roughness (Ra) of the main planes of the glass substrate after the main planes are polished and cleaned is measured by the AFM (Atomic Force Microscope), and a micro waviness (μWa) of the same is measured by the scanning white interferometer. In present Example, the arithmetic mean roughness (Ra) is 0.15 nm or less in all polishing batches. The micro waviness (μWa) is 0.15 nm or less in all polishing batches.

A surface roughness is specified based on the roughness that is measured by the atomic force microscope (manufactured by Digital Instrument Corporation, Nano Scope D3000). The measuring area is set in the area, which has a length of 0.5 μm and a width of 1.0 μm, located in the middle portion of the recording/reproducing area of the glass substrate. The number of measuring points is set at two locations of 0°, 180° in plane, and the surface roughness is measured at four locations of the front surface and the back surface of the glass substrate in total.

The micro waviness is specified based on the undulation that is measured by the scanning white interferometer (manufactured by Zyro Corporation, Zyro New View 5032). The measuring area is set in the area, which has a length of 0.7 mm and a width of 1.0 mm, located in the middle portion of the recording/reproducing area of the glass substrate. The number of measuring points is set at two locations of 0°, 180° in plane, and the micro waviness is measured at four locations of the front surface and the back surface of the glass substrate in total.

With the above, this Example shows the case where the present invention is applied to the primary polishing step. But the present invention may be applied to the lapping step, the peripheral end surface polishing step, the secondary polishing step, or the ternary polishing step.

Figure 9B:
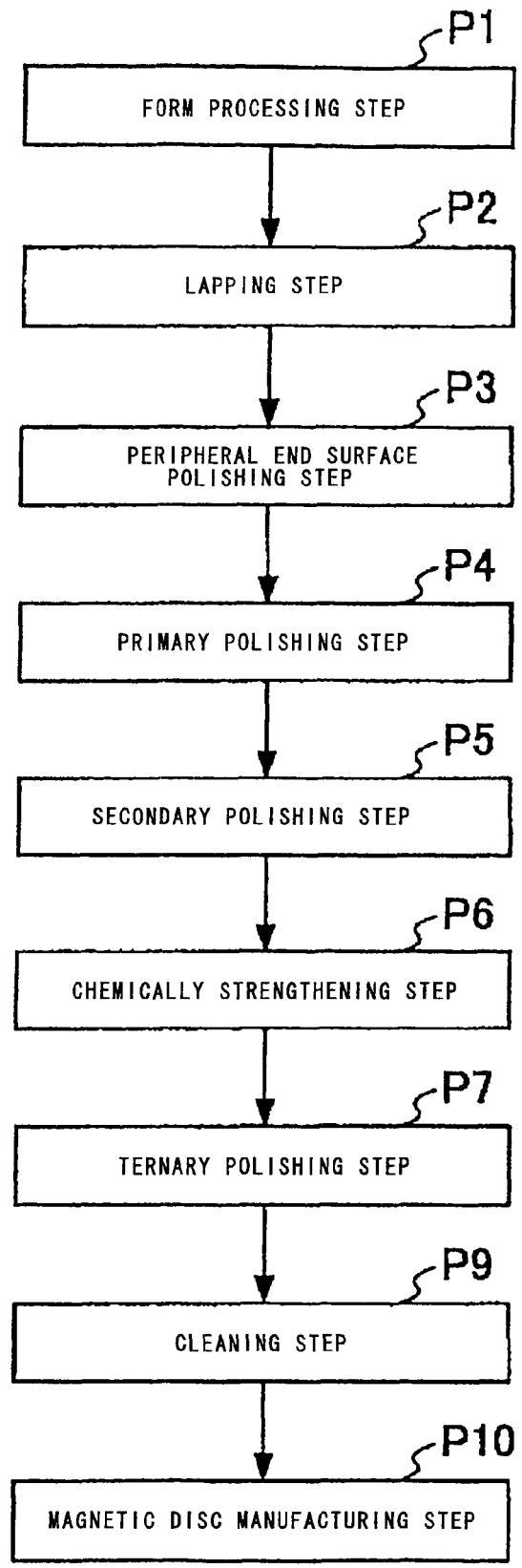
FIG. 9B is a flowchart showing a second example of the steps of manufacturing a glass substrate for a magnetic recording medium and a magnetic disc.
Figure 9C:
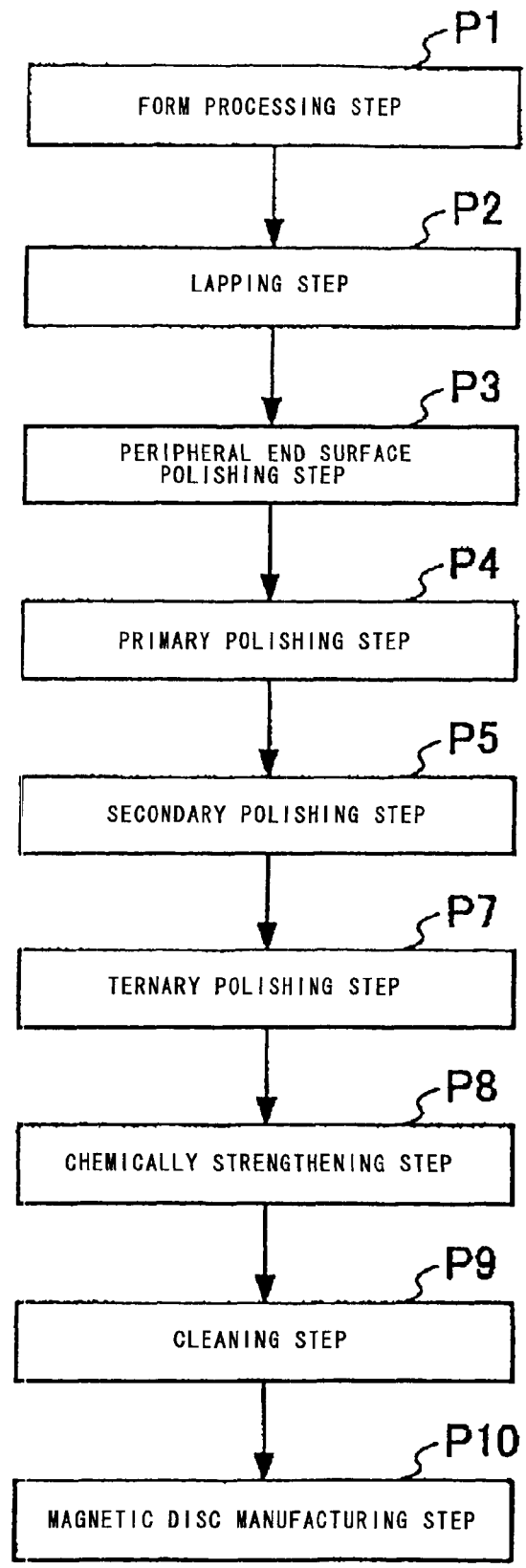
FIG. 9C is a flowchart showing a third example of the steps of manufacturing a glass substrate for a magnetic recording medium and a magnetic disc.

Here, other manufacturing processes in which the chemically strengthening step is added to the manufacturing processes shown in FIG. 9A respectively are shown in FIG. 9B and FIG. 9C. FIG. 9B is a flowchart in which the chemically strengthening step P6 is added between the secondary polishing step P5 and the ternary polishing step P7. FIG. 9C is a flowchart in which the chemically strengthening step P8 is added between the ternary polishing step P7 and the cleaning step P9. The present invention can be applied to the flowchart shown in FIG. 9B or FIG. 9C.

In the chemically strengthening step P6 or P8, for example, the chemical strengthening executed by the low-temperature ion-exchange treatment is applied to the glass substrate. A rigidity of the glass substrate can be enhanced by executing the chemical strengthening.

What is claimed is:

1. A glass substrate manufacturing method, comprising:
    deriving in advance a correlation between a first variable which changes in response to at least one of an electric power and an electric energy required for driving a motor of a polishing apparatus and a second variable which changes in response to an amount of polishing of a glass substrate; and
    polishing the glass substrate by driving the motor provided in the polishing apparatus,
    wherein the polishing of the glass substrate comprises executing an adjusting operation which adjusts the amount of polishing of the glass substrate in compliance with the correlation between the first variable and the second variable derived in advance.

2. The glass substrate manufacturing method according to claim 1, wherein the adjusting operation is executed based on at least one of the electric power and the electric energy during the driving of the motor.

3. The glass substrate manufacturing method according to claim 1, wherein:
    the first variable is an average electric power value as a value obtained by dividing the electric energy by a driving time of the motor;
    the second variable is a multiplied value obtained by multiplying a number of sheets of the glass substrate by a polishing rate as a value given by dividing the amount of polishing of the glass substrate by the driving time of the motor;
    the correlation is relational expressions among the amount of polishing of the glass substrate, the electric energy, and the driving time of the motor, which are specified by deriving coefficients of a recursion formula that represents a relation between the average electric power value and the multiplied value; and
    the adjusting operation is a driving operation for driving the motor while substituting sequentially the electric energy and the driving time of the motor into the relational expressions during the driving of the motor until the amount of polishing of the glass substrate derived from the relational expressions reaches a predetermined target value.

4. The glass substrate manufacturing method according to claim 1, wherein the polishing is in manufacturing processes including a form processing process, a peripheral end surface polishing process, and a cleaning process.

5. The glass substrate manufacturing method according to claim 4, wherein a chemically strengthening process is in the manufacturing processes.

6. The glass substrate manufacturing method according to claim 1, wherein the glass substrate is a magnetic recording medium glass substrate.

7. The glass substrate manufacturing method according to claim 1, wherein the motor is configured to drive a polishing device comprising a platen and an abrasive pad positioned on the platen.

8. A glass substrate polishing method of polishing a glass substrate, comprising:
    deriving in advance a correlation between a first variable which changes in response to at least one of an electric power and an electric energy required for driving a motor of a polishing apparatus and a second variable which changes an amount of polishing of a glass substrate; and adjusting the amount of polishing of the glass substrate in compliance with the correlation derived in advance.

9. The glass substrate polishing method according to claim 8, wherein the amount of polishing of the glass substrate is adjusted based on at least one of the electric power the electric energy during the driving of the motor.

10. The glass substrate polishing method according to claim 8, wherein:
the first variable is an average electric power value as a value obtained by dividing the electric energy by a driving time of the motor;
the second variable is a multiplied value obtained by multiplying a number of sheets of the glass substrate by a polishing rate as a value given by dividing the amount of polishing of the glass substrate by the driving time of the motor;
the correlation is relational expressions among the amount of polishing of the glass substrate, the electric energy, and the driving time of the motor, which are specified by deriving coefficients of a recursion formula that represents a relation between the average electric power value and the multiplied value; and
the motor is driven while substituting sequentially the electric energy and the driving time of the motor into the relational expressions during the driving of the motor until the amount of polishing of the glass substrate derived from the relational expressions reaches a predetermined target value.

11. The glass substrate polishing method according to claim 8, wherein the glass substrate is a magnetic recording medium glass substrate.

12. A glass substrate that is polished by the glass substrate polishing method according to claim 8.

13. The glass substrate manufacturing method according to claim 8, wherein the motor is configured to drive a polishing device comprising a platen and an abrasive pad positioned on the platen.

14. A polishing apparatus, comprising:
a polishing device configured to polish a glass substrate;
a motor which drives the polishing device; and
a controlling unit configured to control the motor,
wherein the controlling unit executes an adjusting operation which adjusts an amount of polishing of the glass substrate in compliance with a correlation between a first variable which changes in response to at least one of an electric power and an electric energy required for driving the motor and a second variable which changes in response to an amount of polishing of the glass substrate, and the correlation is derived in advance of the polishing of the glass substrate.

15. The polishing apparatus according to claim 14, wherein the adjusting operation is executed during the driving of the motor based on at least one of the electric power and the electric energy.

16. A polishing apparatus according to claim 14, wherein:
the first variable is an average electric power value as a value obtained by dividing the electric energy by a driving time of the motor;
the second variable is a multiplied value obtained by multiplying a number of sheets of the glass substrate by a polishing rate as a value given by dividing the amount of polishing of the glass substrate by the driving time of the motor;
the correlation is relational expressions among the amount of polishing of the glass substrate, the electric energy, and the driving time of the motor, which are specified by deriving coefficients of a recursion formula that represents a relation between the average electric power value and the multiplied value; and
the adjusting operation is a driving operation for driving the motor while substituting sequentially the electric energy and the driving time of the motor into the relational expressions during the driving of the motor until the amount of polishing of the glass substrate derived from the relational expressions reaches a predetermined target value.

17. The polishing apparatus according to claim 14, wherein the glass substrate is a magnetic recording medium glass substrate.

18. The polishing apparatus according to claim 14, wherein the polishing device comprises a platen and an abrasive pad positioned on the platen.

* * * * *